United States Patent
Lee et al.

(10) Patent No.: US 10,536,215 B2
(45) Date of Patent: Jan. 14, 2020

(54) DEVICE AND METHOD FOR TIME DIVISION DUPLEX AND FREQUENCY DUPLEX CARRIER AGGREGATION IN WIRELESS COMMUNICATION SYSTEM

(71) Applicant: Samsung Electronics Co., Ltd., Suwon-si, Gyeonggi-do (KR)

(72) Inventors: Hee-Kwang Lee, Suwon-si (KR); Il-Won Kwon, Seoul (KR); Jung-Ah Choi, Seoul (KR); Jae-Ho Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/129,275

(22) PCT Filed: Mar. 19, 2015

(86) PCT No.: PCT/KR2015/002672
§ 371 (c)(1),
(2) Date: Sep. 26, 2016

(87) PCT Pub. No.: WO2015/147480
PCT Pub. Date: Oct. 1, 2015

(65) Prior Publication Data
US 2017/0111106 A1     Apr. 20, 2017

Related U.S. Application Data

(60) Provisional application No. 61/970,528, filed on Mar. 26, 2014, provisional application No. 61/978,494, (Continued)

(30) Foreign Application Priority Data

May 2, 2014   (KR) .................. 10-2014-0053704
May 7, 2014   (KR) .................. 10-2014-0054239

(51) Int. Cl.
*H04B 7/26*     (2006.01)
*H04L 5/00*     (2006.01)
(Continued)

(52) U.S. Cl.
CPC ........... *H04B 7/2615* (2013.01); *H04L 5/001* (2013.01); *H04W 72/042* (2013.01); *H04W 88/02* (2013.01); *H04W 88/08* (2013.01)

(58) Field of Classification Search
CPC combination set(s) only.
See application file for complete search history.

(56) References Cited

U.S. PATENT DOCUMENTS

| 9,936,487 B2 * | 4/2018 | Yang ................. H04W 72/0413 |
| 2011/0195704 A1 * | 8/2011 | Choi ................. H04W 72/1263 455/423 |

(Continued)

FOREIGN PATENT DOCUMENTS

| CN | 103404047 A | 11/2013 |
| CN | 103444118 A | 12/2013 |

(Continued)

OTHER PUBLICATIONS

Sharp, Deployment scenarios and requirements for TDD-FDD CA, 2013.*

(Continued)

*Primary Examiner* — Vinncelas Louis
(74) *Attorney, Agent, or Firm* — Jefferson IP Law, LLP

(57) ABSTRACT

An apparatus and a method for a carrier aggregation (CA) operation using a Frequency Division Duplex (FDD) carrier and a Time Division Duplex (TDD) carrier in a wireless communication system are provided. The method includes receiving downlink signals via downlink FDD TDD CA using a first carrier operated in an FDD mode and a second carrier operated in a TDD mode and transmitting, via the (Continued)

first carrier, uplink signals corresponding to the downlink signals received via the first and second carriers.

17 Claims, 24 Drawing Sheets

Related U.S. Application Data filed on Apr. 11, 2014, provisional application No. 61/983,712, filed on Apr. 24, 2014.

(51) Int. Cl.
*H04W 72/04* (2009.01)
*H04W 88/02* (2009.01)
*H04W 88/08* (2009.01)

(56) References Cited

U.S. PATENT DOCUMENTS

| | | | |
|---|---|---|---|
| 2011/0286370 A1* | 11/2011 | Tang | H04W 72/0446 |
| | | | 370/280 |
| 2012/0106404 A1 | 5/2012 | Damnjanovic | |
| 2012/0257524 A1 | 10/2012 | Chen et al. | |
| 2012/0322455 A1* | 12/2012 | Oh | H04W 72/048 |
| | | | 455/450 |
| 2013/0315114 A1 | 11/2013 | Seo et al. | |
| 2013/0343239 A1 | 12/2013 | Damnjanovic et al. | |
| 2014/0003258 A1 | 1/2014 | Schmitt | |
| 2014/0003303 A1 | 1/2014 | Yang et al. | |
| 2014/0010086 A1 | 1/2014 | Etemad et al. | |
| 2014/0010125 A1* | 1/2014 | Tillman | H04B 7/2643 |
| | | | 370/280 |
| 2014/0029484 A1 | 1/2014 | Choi et al. | |
| 2014/0031054 A1 | 1/2014 | Zou et al. | |
| 2014/0036818 A1 | 2/2014 | Koskela et al. | |
| 2014/0043979 A1 | 2/2014 | Etemad et al. | |
| 2014/0044105 A1 | 2/2014 | Bontu et al. | |
| 2014/0050127 A1 | 2/2014 | Wang et al. | |
| 2014/0071937 A1 | 3/2014 | Klatt | |
| 2014/0071976 A1 | 3/2014 | Anand et al. | |
| 2014/0078942 A1 | 3/2014 | Noh et al. | |
| 2014/0086078 A1 | 3/2014 | Malladi et al. | |
| 2014/0153449 A1 | 6/2014 | Seo et al. | |
| 2015/0055521 A1 | 2/2015 | Seo et al. | |
| 2015/0117275 A1* | 4/2015 | Park | H04L 1/1812 |
| | | | 370/280 |
| 2016/0065350 A1 | 3/2016 | Suzuki et al. | |
| 2016/0142991 A1* | 5/2016 | Classon | H04W 56/001 |
| | | | 370/350 |
| 2017/0005770 A1 | 1/2017 | Shimezawa et al. | |
| 2017/0353204 A1 | 12/2017 | He et al. | |

FOREIGN PATENT DOCUMENTS

| | | | |
|---|---|---|---|
| CN | 103460635 | A | 12/2013 |
| EP | 2688237 | A2 | 1/2014 |
| EP | 2697926 | A2 | 2/2014 |
| EP | 2835918 | A1 | 2/2015 |
| WO | 2012061410 | A2 | 5/2012 |
| WO | 2012109195 | A2 | 8/2012 |
| WO | 2012142128 | A2 | 10/2012 |
| WO | 2013151396 | A1 | 10/2013 |
| WO | 2013/170426 | A1 | 11/2013 |
| WO | 2013/192601 | A2 | 12/2013 |
| WO | 2014/007595 | A1 | 1/2014 |

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331, V10.0.0, Dec. 2010, pp. 1-276, 3GPP, Valbonne, France.
RAN WG1, LS on RAN1 TDD-FDD CA Status and Related RRC Impact, 3GPP TSG RAN WG1 Meeting #76, Prague, Czech Republic, Feb. 10-14, 2014, Release 12, R1-141065.
Sharp, TDD-FDD Carrier Aggregation Solution, 3GPP TSG RAN WG1 Meeting #74bis, Guangzhou, China, Oct. 7-11, 2013, R1-134473.
LG Electronics, Basic Assumptions and Requirements for TDD-FDD CA, 3GPP TSG RAN WG1 Meeting #75, San Francisco, USA, Nov. 11-15, 2013, pp. 1-4, R1-135463.
Sharp, Deployment Scenarios and Requirements for TDD-FDD CA, 3GPP TSG RAN WG1 Meeting #74, Barcelona, Spain, Aug. 19-23, 2013, pp. 1-3, R1-133232.
Texas Instruments, On L1 Signaling for Dynamic TDD UL/DL Reconfiguration, 3GPP TSG RAN WG1 #76, Prague, Czech Republic, Feb. 10-14, 2014, R1-140531.
Catt et al., Introduction of DRX for TDD eITMA—Alternative 1, Change Request, 3GPP TSG-RAN WG2 Meeting #85, Prague, Czech Republic, Feb. 10-14, 2014, R2-140105.
Catt: "Half duplex UE operation for FDD-TDD CA", 3GPP Draft; R1-140105, 3rd Generati0n Partnership Pr0ject (3GPP), M0bile C0mpetence Centre ; 650, R0ute Des Luci0les ; F-06921 S0phia-Antip0lis Cedex; France, vol. RAN WGI, No. Prague, Czech Republic; Feb. 10-14, 2014, XP050735670.
"LTE; Evolved Universal Terrestrial Radio Access (E-UTRA); User Equipment (UE) radio transmission and reception (3GPP TS 36.101 version 11.6.0 Release 11)", Technical Specification, European Telecommunications Standards Institute (ETSI), 650, Route Des Lucioles ; F-06921 Sophia-Antipolis ; France, vol. 3GPP RAN 4, No. VII.6.0, Oct. 1, 2013, XP014157685.
Non-Final Office Action dated Sep. 14, 2018 issued in U.S. Appl. No. 15/129,289.
Chinese Office Action dated Jan. 25, 2019, issued in the Chinese Application No. 201580022232.X.
U.S. Notice of Allowance dated Jan. 23, 2019, issued in the U.S. Appl. No. 15/129,289.

* cited by examiner

◯ : TDD coverage including uplink

◯ : TDD coverage including uplink

| Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

| D | Downlink subframe (602) |
|---|---|
| U | Uplink subframe (604) |
| S | Special subframe (606) |

FIG.6

DEVICE AND METHOD FOR TIME DIVISION DUPLEX AND FREQUENCY DUPLEX CARRIER AGGREGATION IN WIRELESS COMMUNICATION SYSTEM

TECHNICAL FIELD

The present invention is to support Carrier Aggregation (CA) using a plurality of carriers in a wireless communication system.

BACKGROUND ART

Advantages and disadvantages of Frequency Division Duplex (FDD) and Time Division Duplex (TDD) are as follows. The FDD is suitable for a service such as voice which generates symmetric traffic, and the TDD is suitable for a service such as Internet or data, which is bursty and has asymmetric traffic. The TDD utilizes a spectrum more efficiently. The FDD cannot be used in an environment where a service provider has no sufficient bandwidth for offering a guardband required between transmit and receive channels. The TDD is more flexible than the FDD in satisfying a demand for dynamically configuring an uplink and a downlink in response to customer needs.

Carrier Aggregation (CA) is a technique defined in a Long Term Evolution (LTE)-Advanced (A) system. The CA enables aggregation of multiple carriers so as to attain a wider overall system bandwidth. Thus, a peak data rate of the system can increase. Currently, only the CA of TDD carriers and the CA of FDD carriers are supported, and there are no standards or techniques for combining the TDD carriers and the FDD carriers.

DISCLOSURE OF INVENTION

Technical Problem

An embodiment of the present invention provides an apparatus and a method for a Carrier Aggregation (CA) operation using a Frequency Division Duplex (FDD) carrier and a Time Division Duplex (TDD) carrier in a wireless communication system.

An embodiment of the present invention provides an apparatus and a method for improving a data rate in a CA operation using an FDD carrier and a TDD carrier in a wireless communication system.

An embodiment of the present invention provides an apparatus and a method for performing scheduling in a CA operation using an FDD carrier and a TDD carrier in a wireless communication system.

An embodiment of the present invention provides an apparatus and a method for transmitting control information in a CA operation using an FDD carrier and a TDD carrier in a wireless communication system

Solution to Problem

According to an embodiment of the present invention, a method for operating a terminal in a wireless communication system includes receiving a downlink signal using downlink Frequency Division Duplex (FDD)-Time Division Duplex (TDD) Carrier Aggregation (CA) which uses a first carrier operated using an FDD scheme and a second carrier operated using a TDD scheme, and transmitting an uplink signal corresponding to a downlink signal received over the first carrier and a downlink signal received over the second carrier, over the first carrier.

According to another embodiment of the present invention, a method for operating at least one base station in a wireless communication system includes transmitting a downlink signal to a terminal using downlink FDD-TDD CA which uses a first carrier operated using an FDD scheme and a second carrier operated using a TDD scheme, and receiving from the terminal an uplink signal corresponding to a downlink signal received over the first carrier and a downlink signal received over the second carrier, over the first carrier.

According to yet another embodiment of the present invention, an apparatus of a terminal in a wireless communication system includes a receiver for receiving a downlink signal using downlink Frequency Division Duplex (FDD)-Time Division Duplex (TDD) Carrier Aggregation (CA) which uses a first carrier operated using an FDD scheme and a second carrier operated using a TDD scheme, and a transmitter for transmitting an uplink signal corresponding to a downlink signal received over the first carrier and a downlink signal received over the second carrier, over the first carrier.

According to still another embodiment of the present invention, an apparatus of at least one base station in a wireless communication system includes a transmitter for transmitting a downlink signal to a terminal using downlink FDD-TDD CA which uses a first carrier operated using an FDD scheme and a second carrier operated using a TDD scheme, and a receiver for receiving from the terminal an uplink signal corresponding to a downlink signal received over the first carrier and a downlink signal received over the second carrier, over the first carrier.

Advantageous Effects of Invention

The wireless communication system can support the CA combining the FDD carriers and the TDD carriers. In particular, the TDD coverage, particularly, the TDD coverage using a high frequency is more restricted by the uplink coverage than the FDD coverage. Hence, in this case, the uplink communication is performed only over the FDD cell and thus the TDD coverage is expanded. Therefore, the FDD-TDD CA area can expand and the downlink data rate can improve.

BRIEF DESCRIPTION OF DRAWINGS

FIG. 6 depicts an example of various structures of a TDD frame in a wireless communication system according to an embodiment of the present invention.

BEST MODE FOR CARRYING OUT THE INVENTION

Figure 1:
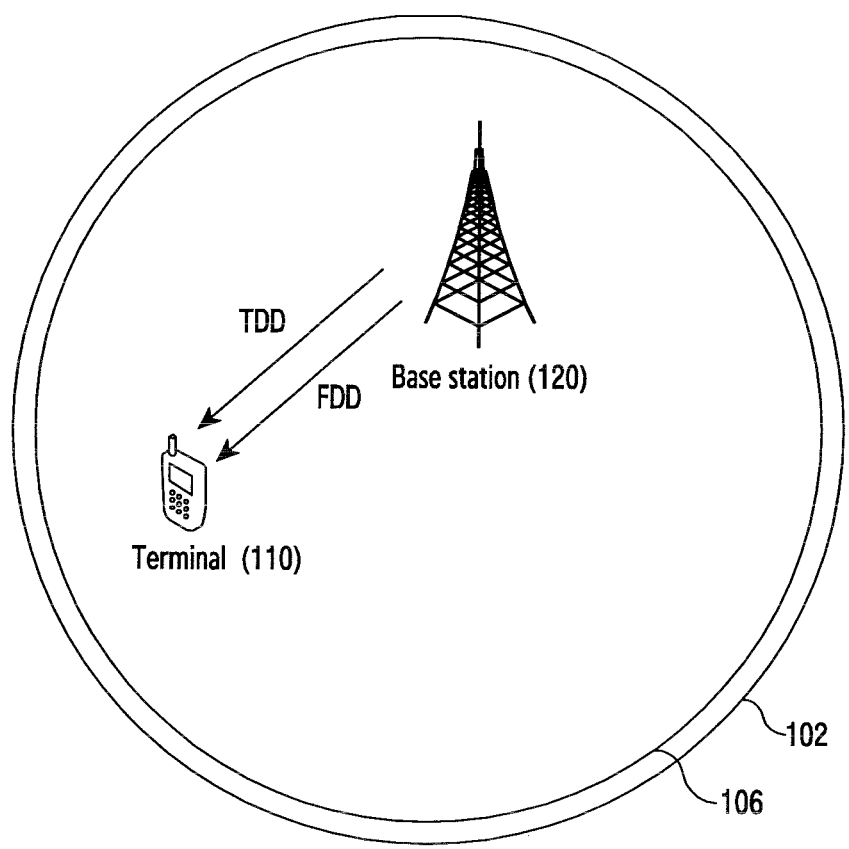
FIG. 1 depicts a configuration example of a Frequency Division Duplex (FDD) cell and a Time Division Duplex (TDD) cell in a wireless communication system according to an embodiment of the present invention.

Hereinafter, an operational principle of the present invention is described in detail with reference to the accompanying drawings. In the following description, well-known functions or constitutions will not be described in detail if they would unnecessarily obscure the invention. Also, terminologies to be described below are defined in consideration of functions in the present invention and may vary depending on a user's or an operator's intention or practice. Thus, their definitions should be defined based on all the contents of the specification.

Hereinafter, the present invention describes a technique for Carrier Aggregation (CA) of a Frequency Division Duplex (FDD) cell and a Time Division Duplex (TDD) cell in a wireless communication system. In the following, terms for identifying cells used, terms indicating network entities, and terms indicating connection states are for the sake of explanations. Accordingly, the present invention is not limited to the terms to be described, and can use other terms indicating objects having technically identical meaning.

Hereafter, to ease the understanding, the present invention employs terms and names defined in Long Term Evolution (LTE) standard. However, the present invention is not limited to the terms and the names, and can be equally applied to systems conforming to other standards.

Hereinafter, an operational principle of the present invention will be described in detail with reference to the accompanying drawings. In the following description, well-known functions or constitutions will not be described in detail if they would unnecessarily obscure the invention. Also, terminologies to be described below are defined in consideration of functions in the present invention and may vary depending on a user's or an operator's intention or practice. Thus, their definitions should be defined based on all the contents of the specification.

Hereafter, terms indicating connection states, which are used to identify carriers, cells, signaling procedures, and network entities, are for the sake of the understanding. Accordingly, the present invention is not limited to the terms to be described, and can use other terms indicating objects having technically identical meaning.

Hereafter, to ease the understanding, the present invention adopts terms and names defined in LTE standard. However, the present invention is not limited to the terms and the names, and can be equally applied to systems conforming to other standards.

Various embodiments of the present invention relate to a technique for supporting CA of a TDD carrier and an FDD carrier. The CA of the TDD carrier and FDD carrier allows providers to utilize all of available spectrum resources, and can also offer system flexibility and performance benefit. That is, since the FDD and TDD spectrums can be used more flexibly, lack of the spectrum resources can be considerably mitigated. Further, the FDD and TDD CA can have advantages in supporting asymmetric traffic. Hereafter, to ease the understanding, the CA using the FDD carrier and the TDD carrier is referred to as 'TDD-TDD CA'.

Frequency bands used for communication are divided in advance into a frequency band for a TDD cell and a frequency band for an FDD cell. Generally, the FDD cell is allocated to a lower frequency band. Accordingly, the FDD cell can be disadvantageous in terms of a data rate but can be advantageous in terms of a coverage. The TDD cell is mostly allocated to a high frequency band. Accordingly, the TDD cell can be disadvantageous in terms of the coverage but can be advantageous in terms of the data rate. Hence, a system according to various embodiments of the present invention supports uplink communication over the FDD cell which uses a relatively lower frequency band and supports downlink communication over both of the FDD cell and the TDD cell by using the advantages of the TDD cell and the FDD cell.

Hereafter, the present invention assumes that the FDD cell uses a lower frequency band, and various embodiments of the present invention support the uplink communication over the FDD cell. However, when the TDD cell uses a lower frequency band, the system according to other embodiments of the present invention can support the uplink communication over the TDD cell.

The system according to an embodiment of the present invention can support the FDD-TDD CA by allocating an additional TDD carrier to a terminal which can recognize the FDD carrier. In so doing, the TDD carrier can belong to a licensed band or an unlicensed band. Alternatively, the system according to an embodiment of the present invention can support the FDD-TDD CA by allocating a TDD carrier and an FDD carrier to a terminal which can recognize both of the FDD carrier and the TDD carrier. In so doing, the FDD carrier can be a Primary cell (Pcell), and the TDD carrier can be a Secondary cell (Scell).

FIG. 1 depicts a configuration example of a FDD cell and a TDD cell in a wireless communication system according to an embodiment of the present invention. Referring to FIG. 1, one base station 120 provides both of an FDD cell 102 and a TDD cell 106 to a terminal 110. The base station 120 can be a macro base station. Accordingly the FDD cell 102 and the TDD cell 106 can have a similar coverage. In so doing, the FDD carrier 102 can be a Pcell, and the TDD carrier 106 can be a Scell.

Figure 2:
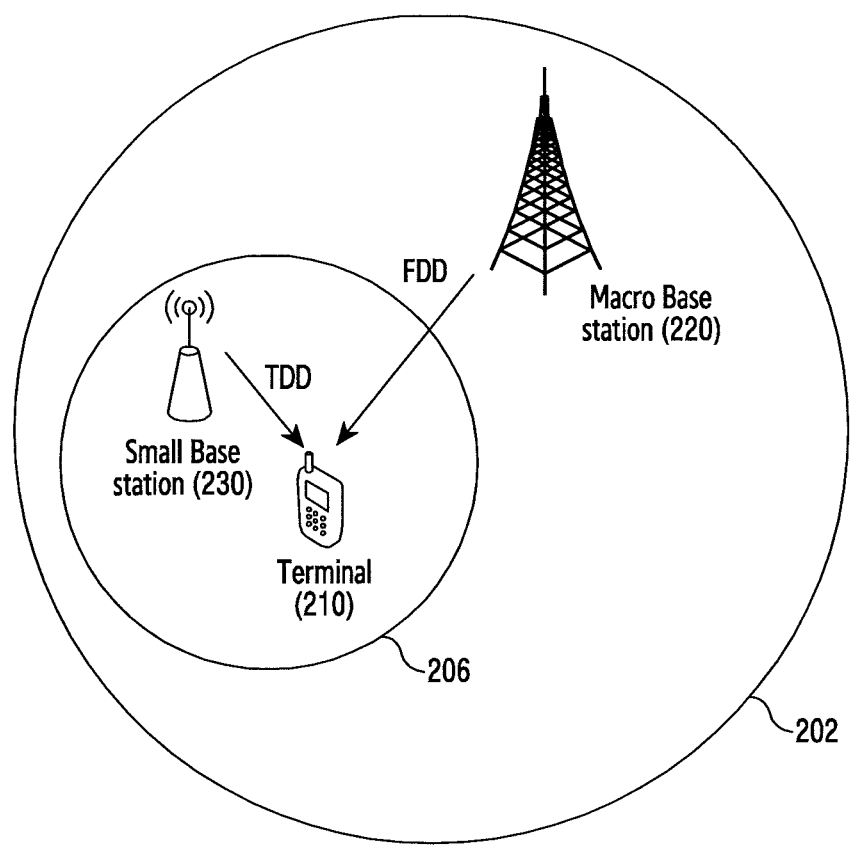
FIG. 2 depicts another configuration example of an FDD cell and a TDD cell in a wireless communication system according to an embodiment of the present invention.

FIG. 2 depicts another configuration example of an FDD cell and a TDD cell in a wireless communication system according to an embodiment of the present invention. Referring to FIG. 2, a terminal 210 is offered a FDD cell 202 from a macro base station 220 and a TDD cell 206 from a small base station 230. Hence, the TDD cell 206 can be included in the FDD cell 202, and a hierarchical cell structure can be built. Yet, according to another embodiment of the present invention, the FDD-TDD CA can be performed even when the entire coverage of the small base station 230 is not included in the coverage of the macro base station 220, rather than the small base station 230 co-located with the coverage of the macro base station 220 as shown in FIG. 2.

The coverage of the cell can be greatly limited by an uplink coverage. This is because an uplink signal is transmitted by a terminal of which power is greatly limited. Specifically, due to limits on uplink/downlink configurations, when the TDD wants to obtain the same uplink data rate as the FDD, the terminal needs to transmit more uplink data over a certain period than the FDD cell. Hence, a Modulation and Coding Scheme (MCS) level or an allocation bandwidth in the TDD cell needs to be higher than the FDD cell. As a result, the uplink coverage of the TDD cell gets smaller than the uplink coverage of the FDD cell, and the coverage of the TDD cell is greatly restricted by the uplink coverage.

Figure 3A:
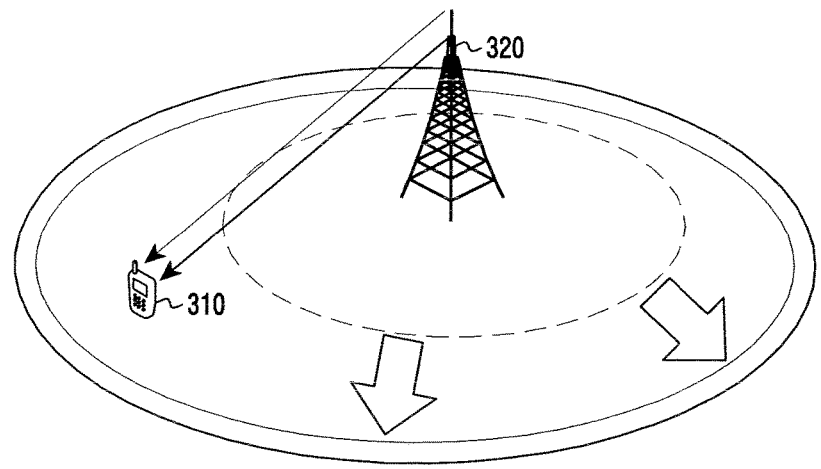
FIG. 3 depicts coverages of an FDD cell and a TDD cell in a wireless communication system according to an embodiment of the present invention.
Figure 3B:
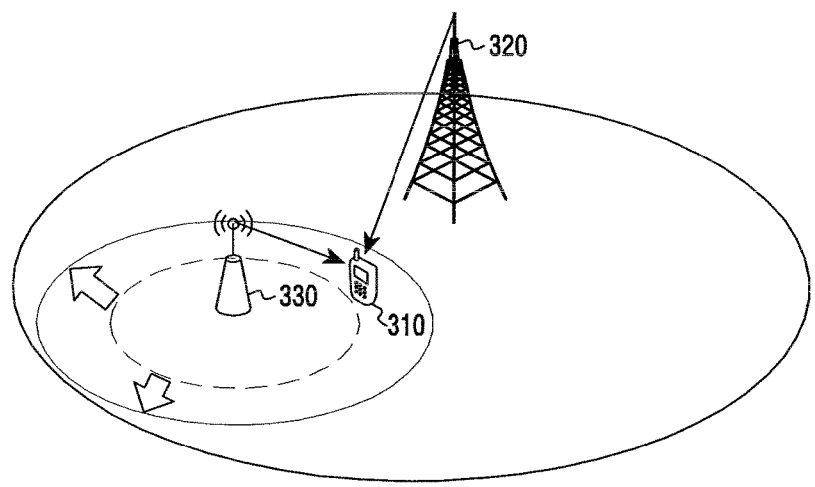

FIG. 3 depicts coverages of an FDD cell and a TDD cell in a wireless communication system according to an embodiment of the present invention. FIG. 3A depicts a case where a macro base station 320 offers both of the FDD cell and the TDD cell, and FIG. 3B depicts a case where the macro base station 320 offers the FDD cell and a small base station 330 offers the TDD cell. Referring to FIG. 3, a TDD coverage including an uplink is smaller than the TDD coverage according to an embodiment of the present invention. That is, a system according to various embodiments of the present invention can expand the TDD cell coverage by performing uplink communication over the FDD cell. Hence, even when a terminal is located outside the uplink coverage of the TDD cell, it can operate in CA including the TDD cell.

According to one embodiment of the present invention, not only uplink traffic but also uplink control information are transferred over the FDD cell. That is, the terminal 310 transmits control information for the TDD cell through an uplink resource of the FDD cell, and does not use an uplink control channel (e.g., Physical Uplink Common Control Channel (PUCCH)) of the TDD cell. That is, the TDD cell is operated in a downlink only mode. Hence, an off-loading rate of the TDD cell rate increases, and an FDD-TDD CA area according to an embodiment of the present invention is expanded. As a result, downlink throughput can further increase.

Figure 4:
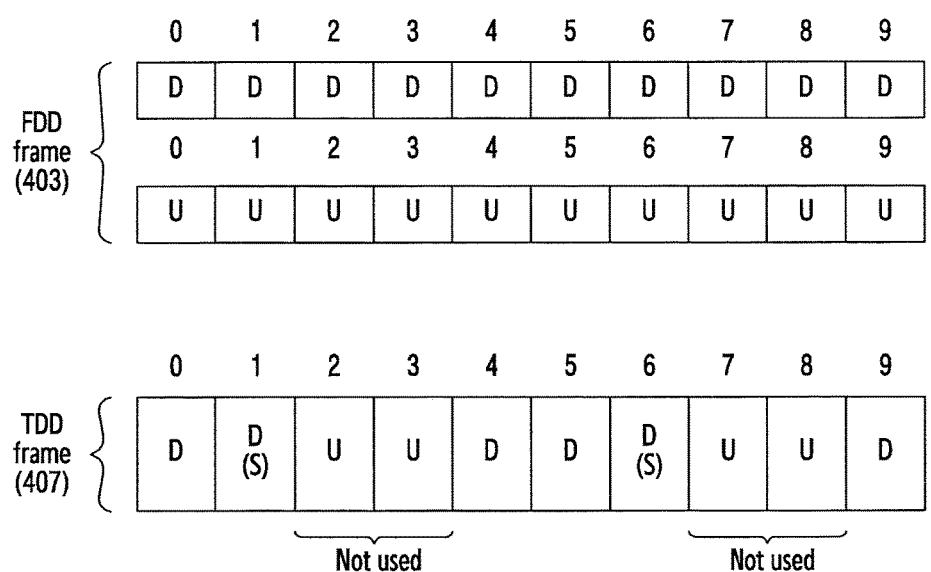
FIG. 4 depicts a frame structure example of an FDD cell and a TDD cell in a wireless communication system according to an embodiment of the present invention.

FIG. 4 depicts an example of FDD cell and TDD cell frame structures in a wireless communication system according to an embodiment of the present invention.

Referring to FIG. 4, an FDD frame 403 and a TDD frame 407 each can include ten subframes. The FDD frame 403 includes ten downlink subframes and ten uplink subframes divided on a frequency axis, and the TDD frame 407 includes six downlink subframes and four uplink subframes. In the TDD frame 407, a specific rate of the downlink subframes and the uplink subframes can vary according to various embodiments. In particular, according to an embodiment of the present invention, a TDD frame including only downlink subframes can be used.

For a terminal operating in the FDD-TDD CA, the four uplink subframes of the TDD frame 407 are not used. That is, the terminal of the FDD-TDD CA mode can be allocated all of downlink and uplink resources of the FDD frame 403 but the uplink resources of the TDD frame 407 are excluded from the allocation. That is, in the FDD-TDD CA operation, the uplink communication uses only the resources of the FDD frame 403. More specifically, to achieve a coverage expansion effect of the TDD cell, the terminal can transmit control information to be transmitted over a control channel (e.g., PUCCH) of the TDD, over the uplink subframe of the FDD frame 403. Yet, the uplink subframes of the TDD frame 407 can be used by other terminals connected to a corresponding TDD cell but not operating in the FDD-TDD CA.

Figure 5:
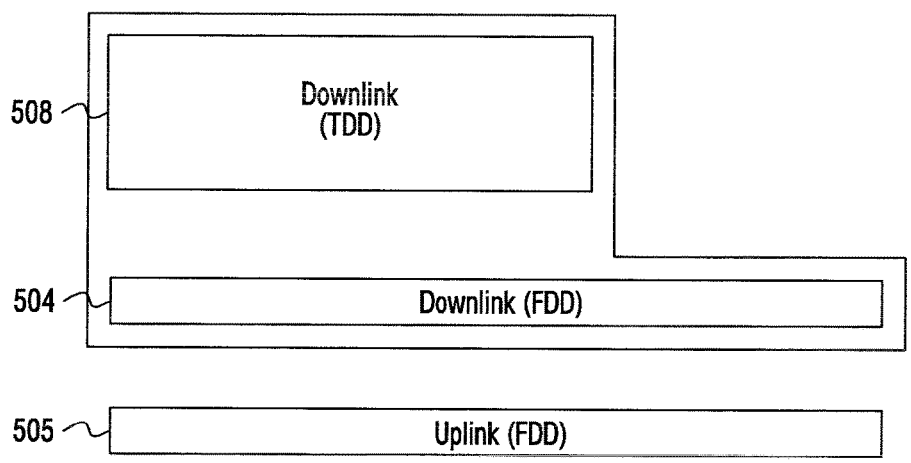
FIG. 5 depicts an available amount of downlink resources and uplink resources in a wireless communication system according to an embodiment of the present invention.

An available amount of the downlink resources and the uplink resources according to the frame structure of FIG. 4 is shown in FIG. 5. FIG. 5 depicts the available amount of downlink resources and uplink resources in a wireless communication system according to an embodiment of the present invention. As shown in FIG. 5, downlink resources 504 of an FDD cell and downlink resources 508 of a TDD cell can be allocated for downlink communication, and uplink resources 505 of the FDD cell can be allocated for uplink communication. Hence, the available amount of the downlink resources greatly increases without reducing the cell coverage. In FIG. 5, while the uplink resources of the TDD cell are not depicted, the TDD cell can also provide the uplink resources and the uplink resources of the TDD cell can be used by another terminal not operating in the FDD-TDD CA.

The TDD frame 407 of FIG. 4 includes the six downlink subframes and the four uplink subframes. The rate of the downlink subframes and the uplink subframes in the TDD frame 407 can vary according to a specific embodiment. For example, TDD frames of FIG. 6 can be used.

FIG. 6 depicts an example of various structures of a TDD frame in a wireless communication system according to an embodiment of the present invention. Referring to FIG. 6, seven TDD frames of configuration 0 through configuration 6 are illustrated. The TDD frame 407 of FIG. 4 corresponds to the configuration 1 of FIG. 6. Further, according to various embodiments of the present invention, besides the seven configurations of FIG. 6, other configurations having different rates of downlink subframes 662 and uplink subframes 664 and different arrangements of the downlink subframes 662 and the uplink subframes 664 can be used. For example, every subframe can be the downlink subframe 662.

Figure 7:
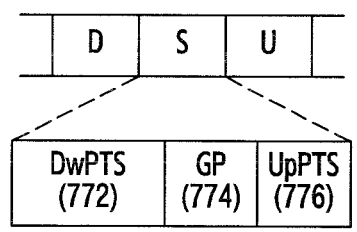
FIG. 7 depicts a structure of a guard time of a TDD frame in a wireless communication system according to an embodiment of the present invention.

The subframe indicated by 'S' in FIG. 6 is a special subframe 666 and includes a guard time for switching from the downlink to the uplink. The special subframe 666 can be configured as shown in FIG. 7. FIG. 7 depicts a structure of a guard time of a TDD frame in a wireless communication system according to an embodiment of the present invention. Referring to FIG. 7, the special subframe 666 includes a Downlink Part (DwPTS) 772, a Guard Period (GP) 774, and an Uplink Part (UpPTS) 776. That is, part of the special subframe 666 can be used for downlink communication and other part of it can be used for uplink communication. The GP 774 is not allocated to a terminal connected to a corresponding TDD cell. However, when operating in the FDD-TDD CA, the terminal does not transmit an uplink signal over the TDD frame and accordingly a base station can utilize resources of the GP 774 and resources of the UpPTS 776 for downlink signal transmission to the terminal. Thus, efficiency of the resource utilization is improved.

In the above embodiments of the present invention, during the FDD-TDD CA operation, the uplink resources of the TDD cell are not used. However, according to another embodiment of the present invention, the uplink resources of the TDD cell can be used to transmit traffic excluding the control signaling. Further, according to yet another embodiment of the present invention, the uplink resources of the TDD cell can be used to transmit not only traffic but also some control signaling.

Figure 8:
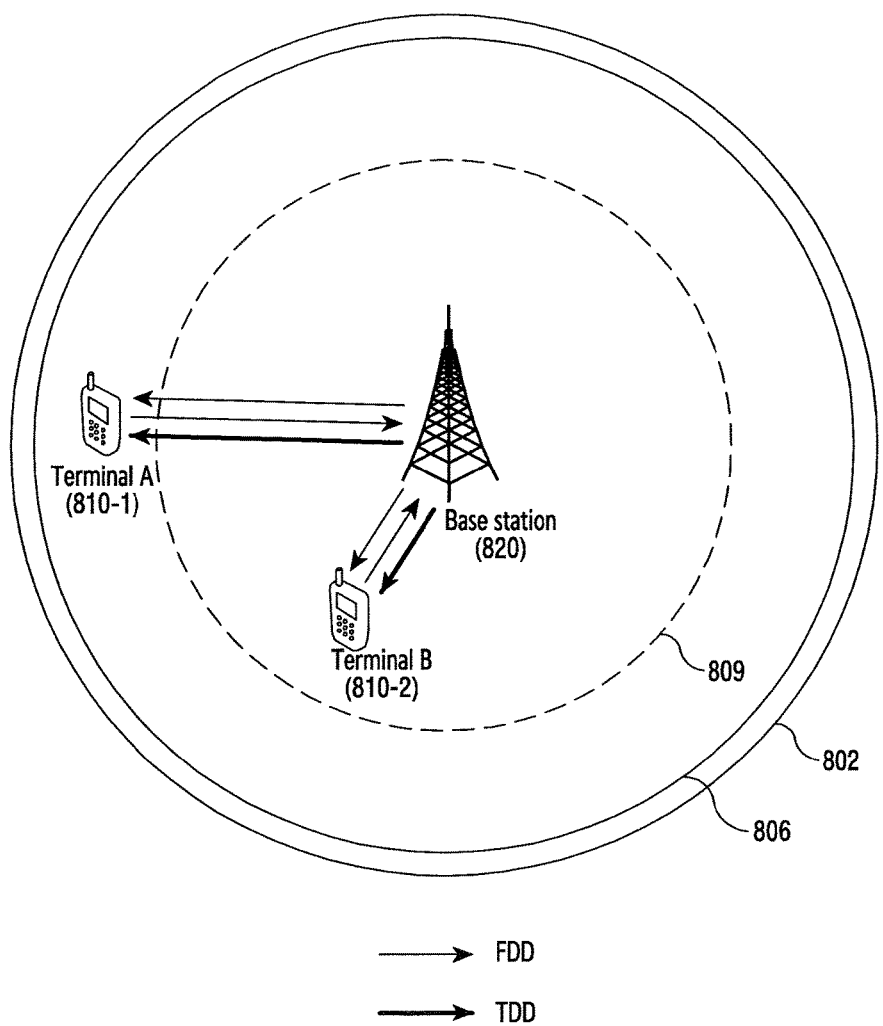
FIG. 8 depicts an example of scheduling according to a mode of a terminal in a wireless communication system according to an embodiment of the present invention.

FIG. 8 depicts an example of scheduling according to a mode of a terminal in a wireless communication system according to an embodiment of the present invention. Referring to FIG. 8, a base station 820 provides an FDD coverage 802 and an expanded TDD coverage 806 according to an embodiment of the present invention. A terminal A 810-1 is outside a TDD uplink coverage 809, and a terminal B 810-2 is inside the TDD uplink coverage 809. The terminal A 810-1 and the terminal B 810-2 operate in the FDD-TDD CA mode. For the terminal A 810-1, the base station 820 performs scheduling using downlink resources and uplink resources of an FDD cell and downlink resources of a TDD cell. For the terminal B 810-2, the base station 820 performs scheduling using the downlink resources and the uplink resources of the FDD cell and the downlink resources of the TDD cell. That is, in the embodiment of FIG. 8, neither of the terminal A 810-1 and the terminal B 810-2 do not perform uplink communication using the expanded TDD coverage 806 according to an embodiment of the present invention. That is, in FIG. 8, the base station 820 fulfills the scheduling regardless of the terminal is located in the TDD uplink coverage 809.

Figure 9:
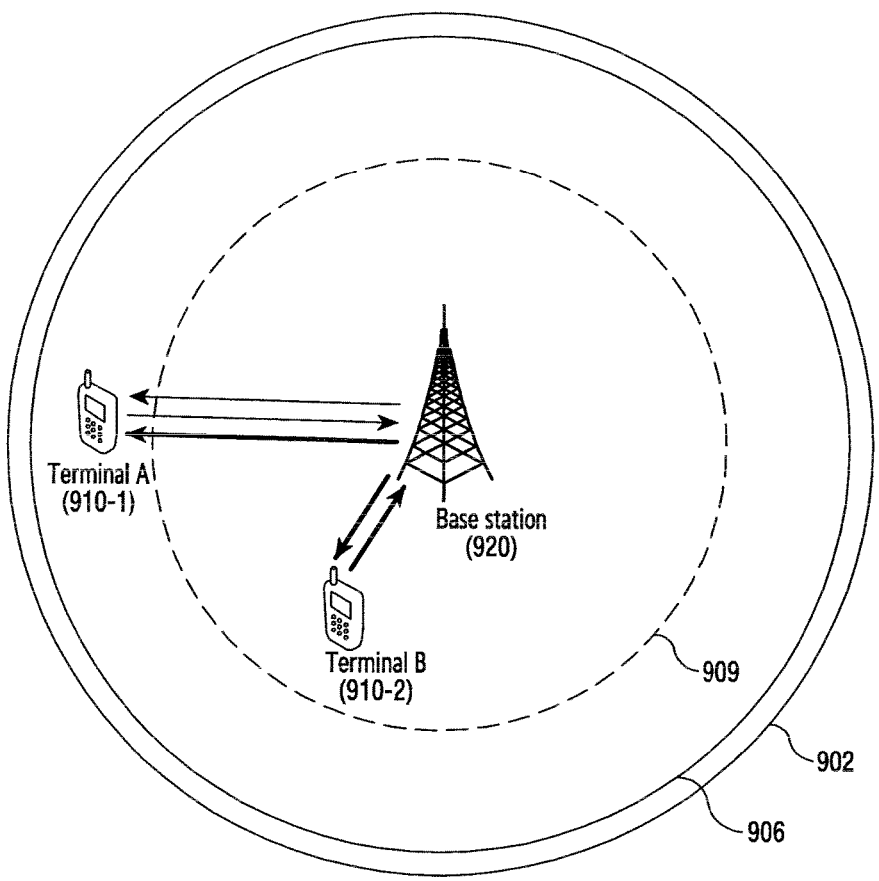
FIG. 9 depicts an example of scheduling according to a mode of a terminal in a wireless communication system according to an embodiment of the present invention.

FIG. 9 depicts another example of scheduling according to a mode of a terminal in a wireless communication system according to an embodiment of the present invention. Referring to FIG. 9, a base station 920 provides an FDD coverage 902 and an expanded TDD coverage 906 according to an embodiment of the present invention. A terminal A 910-1 is outside a TDD uplink coverage 909, and a terminal B 910-2 is within the TDD uplink coverage 909. The terminal A 910-1 operates in an FDD-TDD CA mode and the terminal B 910-2 operates in a TDD mode. For the terminal A 910-1, the base station 920 performs scheduling using downlink resources and uplink resources of an FDD cell and downlink resources of a TDD cell. For the terminal B 910-2, the base station 920 performs scheduling using the downlink resources and the uplink resources of the TDD cell. That is, in the embodiment of FIG. 9, the terminal B 910-2 in the TDD uplink coverage 909 can perform uplink communication using the TDD cell. That is, in FIG. 9, the base station 920 varies a range of the allocable resources according to whether the terminal operates using the FDD-TDD CA or the TDD alone.

Figure 10:
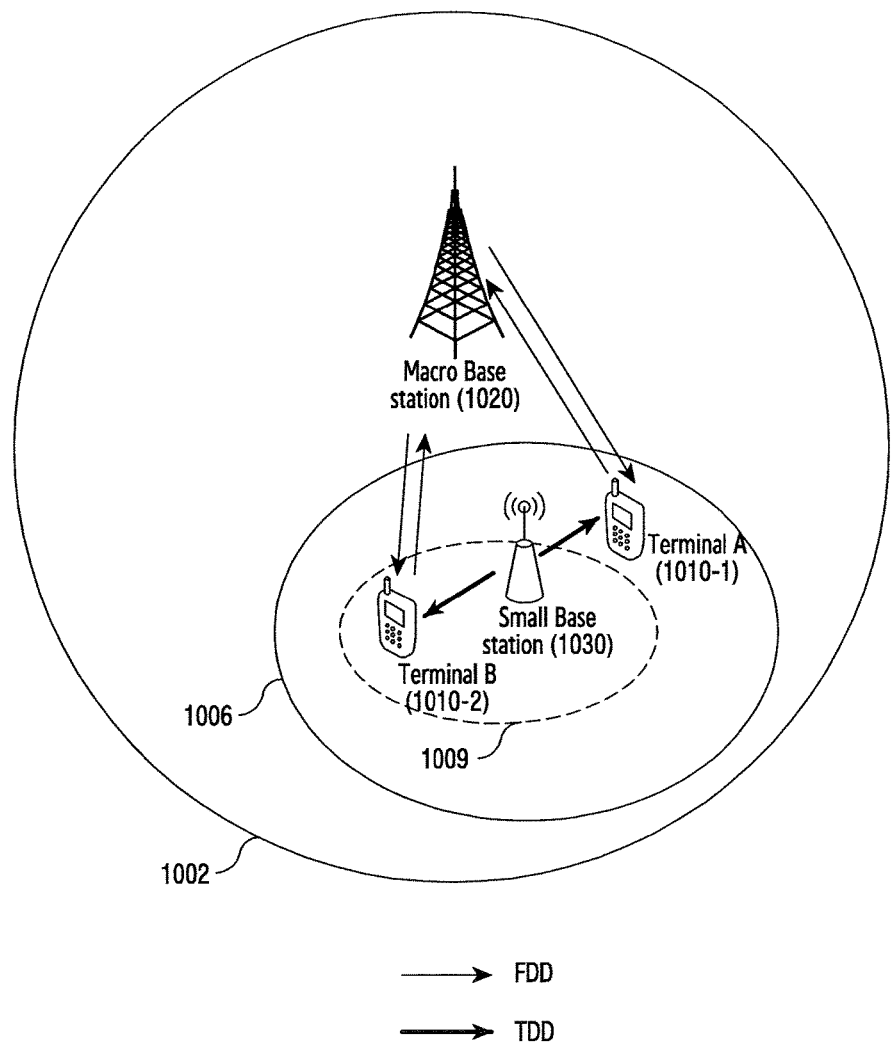
FIG. 10 depicts another example of scheduling according to a mode of a terminal in a wireless communication system according to an embodiment of the present invention.

FIG. 10 depicts an example of scheduling according to a mode of a terminal in a wireless communication system according to an embodiment of the present invention. Referring to FIG. 10, a macro base station 1020 provides an FDD coverage 1002, and a small base station 1030 provides an expanded TDD coverage 1006 according to an embodiment of the present invention. A terminal A 1010-1 is outside a TDD uplink coverage 1009, and a terminal B 1010-2 is within the TDD uplink coverage 1009. The terminal A 1010-1 and the terminal B 1010-2 operates in an FDD-TDD CA mode. For the terminal A 1010-1, the macro base station 1020 performs scheduling using downlink resources and uplink resources of an FDD cell, and the small base station 1030 performs scheduling using downlink resources of a TDD cell. For the terminal B 1010-2, the base station 1020 performs scheduling using the downlink resources and the uplink resources of the FDD cell, and the small base station 1030 performs scheduling using the downlink resources of the TDD cell. That is, in the embodiment of FIG. 10, neither of the terminal A 1010-1 and terminal B 1010-2 conduct uplink communication using the expanded TDD coverage 1006 according to an embodiment of the present invention. That is, in FIG. 10, the macro base station 1020 fulfills the scheduling regardless of whether the terminal is located in the TDD uplink coverage 1009.

Figure 11:
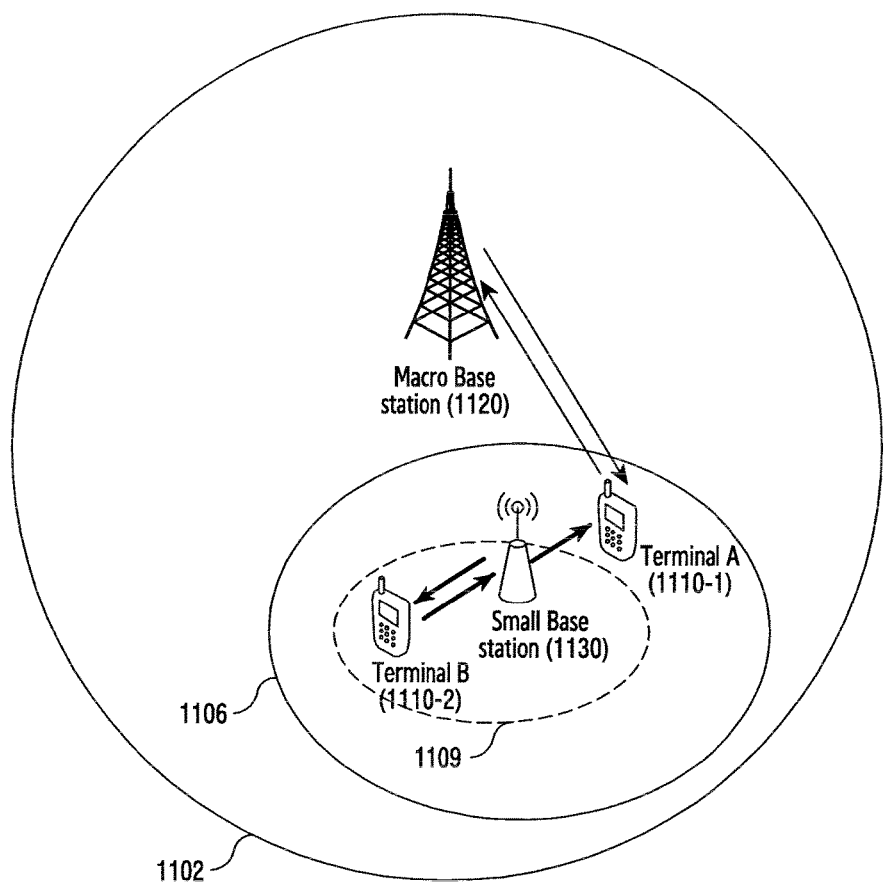
FIG. 11 depicts yet another example of scheduling according to a mode of a terminal in a wireless communication system according to an embodiment of the present invention.

FIG. 11 depicts another example of scheduling according to a mode of a terminal in a wireless communication system according to an embodiment of the present invention. Referring to FIG. 11, a macro base station 1120 provides an FDD coverage 1102, and a small base station 1130 provides an expanded TDD coverage 1106 according to an embodiment of the present invention. A terminal A 1110-1 is outside a TDD uplink coverage 1109, and a terminal B 1110-2 is within the TDD uplink coverage 1109. The terminal A 1110-1 operates in an FDD-TDD CA mode and the terminal B 1110-2 operates in a TDD mode. For the terminal A 1110-1, the macro base station 110 performs scheduling using downlink resources and uplink resources of the FDD cell, and the small base station 1130 performs scheduling using the downlink resources of the TDD cell. For the terminal B 1110-2, the macro base station 1120 allocates no resources, and the small base station 1130 performs scheduling using the downlink resources and the uplink resources of the TDD cell. That is, in the embodiment of FIG. 11, the terminal B 1110-2 in the TDD uplink coverage 1109 can perform uplink communication using the TDD cell. That is, in FIG. 11, the macro base station 1120 varies a range of the allocable resources according to whether the terminal operates using the FDD-TDD CA or the TDD alone.

Figure 12:
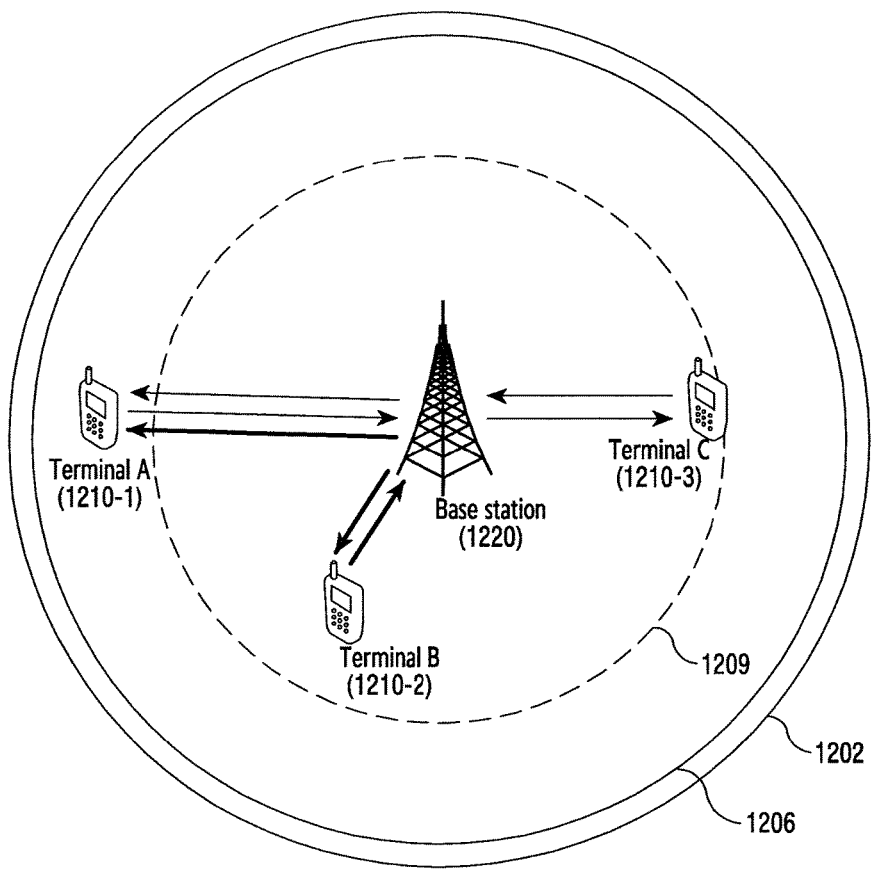
FIG. 12 depicts still another example of scheduling according to a mode of a terminal in a wireless communication system according to an embodiment of the present invention.

FIG. 12 depicts yet another example of scheduling according to a mode of a terminal in a wireless communication system according to an embodiment of the present invention. Referring to FIG. 12, a base station 1220 provides an FDD coverage 1202 and an expanded TDD coverage 1206 according to an embodiment of the present invention. The terminal A 1210-1 operates in an FDD-TDD CA mode, the terminal B 1210-2 operates in a TDD mode, and the terminal C 1210-3 operates in an FDD mode. For the terminal A 1210-1, the base station 1220 performs scheduling using downlink resources and uplink resources of the FDD cell and downlink resources of the TDD cell. For the terminal B 1210-2, the base station 1220 performs scheduling using the downlink resources and the uplink resources of the TDD cell. For the terminal B 1210-3, the base station 1220 performs scheduling using the downlink resources and the uplink resources of the FDD cell. That is, in FIG. 12, the base station 1220 varies a range of the allocable resources according to whether the terminal operates using the FDD-TDD CA, only the TDD, or only the FDD.

According to the LTE standard, in the CA operation, Hybrid Automatic Repeat reQuest (HARQ) Acknowledge (ACK) can be transmitted for up to two carriers using PUCCH format 1b including channel selection, or for up to five carriers using PUCCH format 3. In general, since the FDD cell has the downlink subframe and the uplink subframe in any time period, a timing rule between the downlink data transmission timing and the ACK feedback timing can be maintained constantly. By contrast, since the TDD cell exclusively includes the downlink subframe and the uplink subframe on the time axis, ACKs for downlink data received over different downlink subframes can be fed back over the same uplink subframe.

According to an embodiment of the present invention, in the FDD-TDD CA operation, an uplink control channel (e.g., PUCCH) can be provided only in the FDD cell. Thus, every HARQ ACK for the downlink data is transmitted over the FDD cell. That is, HARQ ACK for downlink data received on the TDD cell is fed back over the uplink control channel of the FDD cell. According to an embodiment of the present invention, the HARQ ACK transmission timing for the TDD cell can follow the HARQ ACK transmission timing of the FDD cell. That is, for the downlink channel (e.g., Physical Downlink Shared Channel (PDSCH)) transmitted on the TDD cell through self-scheduling, the HARQ ACK timing follows the timing of the FDD cell. Also, for the downlink channel transmitted over the FDD cell, the scheduling/HARQ timing follows the timing of the FDD cell. Herein, the HARQ ACK for the downlink channel of the FDD cell and the downlink channel of the TDD cell is delivered over the uplink control channel (e.g., PUCCH) of the FDD cell. For example, the HARQ ACK timing is shown in FIG. 12.

Figure 13:
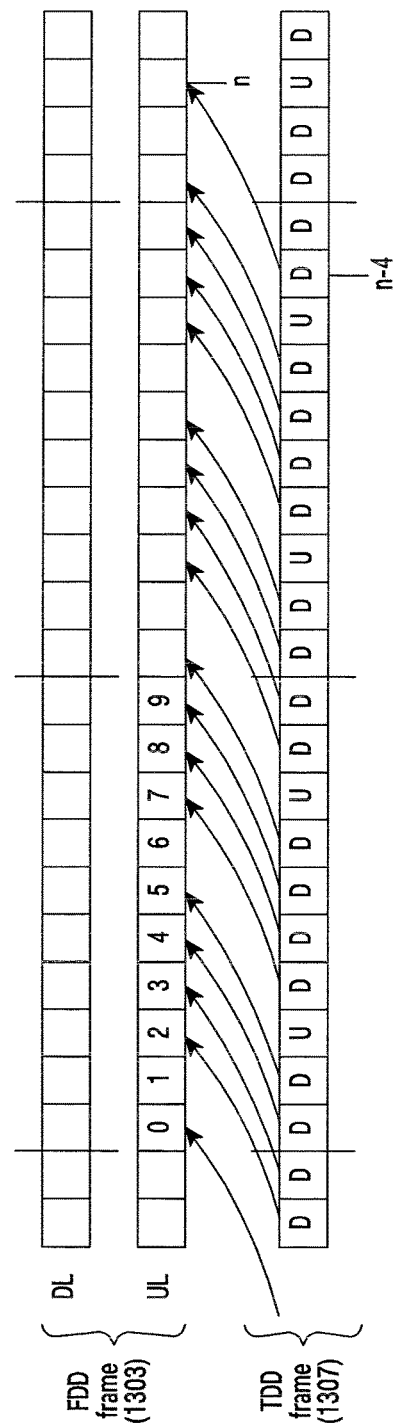
FIG. 13 depicts Hybrid Automatic Repeat request (HARQ) feedback in a wireless communication system according to an embodiment of the present invention.

FIG. 13 depicts HARQ feedback in a wireless communication system according to an embodiment of the present invention. Referring to FIG. 13, an n-th uplink subframe of an FDD cell feeds back HARQ ACK for a downlink channel of an (n-k)-th subframe of a TDD cell. In FIG. 13, k is 4 as an example. However, according to various embodiments of the present invention, a specific value of k can vary.

When CA is configured in a terminal, that is, when two or more serving cells are configured, the terminal reports Channel State Information (CSI) according to separate configuration per serving cell. For example, the configuration can include 'cqi-pmiConfigIndex' and 'ri-configIndex'. In so doing, the terminal operating in the FDD-TDD CA can report both of CSI of the FDD cell and CSI of the TDD cell over the FDD cell as shown in FIG. 14.

Figure 14:
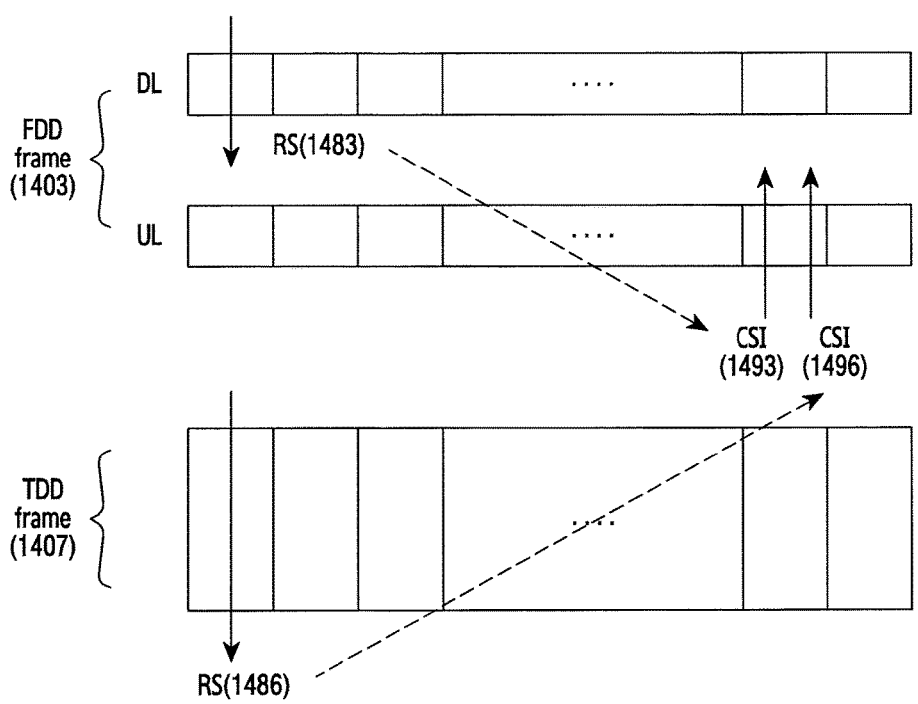
FIG. 14 depicts Channel State Information (CSI) report in a wireless communication system according to an embodiment of the present invention.

FIG. 14 depicts CSI report in a wireless communication system according to an embodiment of the present invention. Referring to FIG. 14, a Reference Signal (RS) 1483 is received in a downlink subframe of an FDD frame 1403, and an RS 1486 is received in a downlink subframe of a TDD frame 1407. Hence, a terminal generates downlink CSI 1493 of an FDD cell using the RS 1483, and generates downlink CSI 1496 of a TDD cell using the RS 1486. The terminal transmits the CSIs 1493 and 1496 to a base station over an uplink subframe of the FDD frame 1403. While the CSIs 1493 and 1496 are transmitted over the same subframe in FIG. 14, the CSIs 1493 and 1496 can be transmitted over different subframes according to another embodiment of the present invention.

In case of periodic CSI report, the terminal can report the CSI using an uplink control channel (e.g., PUCCH). A configurable set of a Channel Quality Indicator (CQI)/Precoding Matrix Index (PMI) report period for the periodic CSI report can differ in the FDD cell and the TDD cell. For example, in the FDD cell, a selectable period set can be, when expressed as the number of the subframes, {2, 5, 10, 20, 40, 80, 160, 32, 64, 128}. In the TDD, a selectable period set can be, when expressed as the number of the subframes, {1, 5, 10, 20, 40, 80, 160}.

In case of aperiodic CSI report, the terminal can report the CSI using an uplink data channel (e.g., PUSCH) scheduled. For example, the terminal can aperiodically report the CSI according to a decoding result of uplink Downlink Control Information (DCI) format 0/4 in the subframe.

Figure 15:
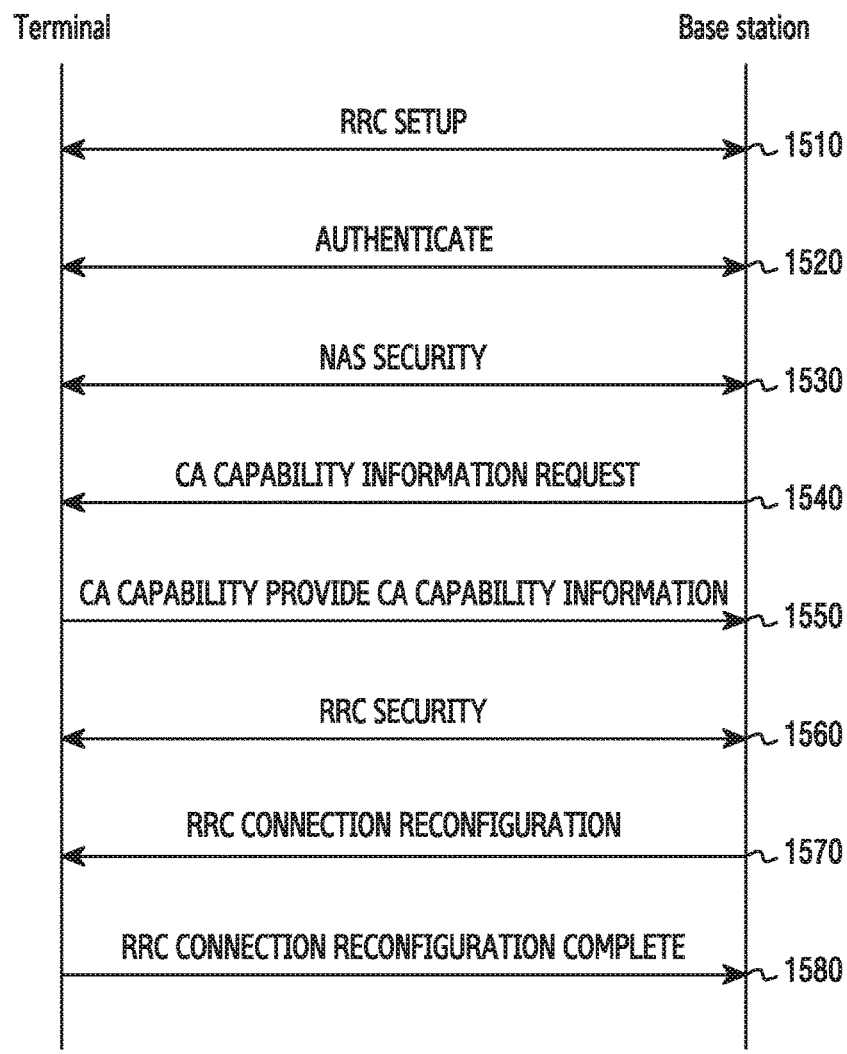
FIG. 15 depicts a signal exchange procedure of a terminal and a base station in a wireless communication system according to an embodiment of the present invention.

FIG. 15 depicts a signal exchange procedure of a terminal and a base station in a wireless communication system according to an embodiment of the present invention.

In step 1510, the terminal and the base station conduct RRC layer setup. For doing so, the terminal can send an RRC connection request message to the base station, the base station can send an RRC connection setup message to the terminal, and the terminal can send an RRC connection setup complete message to the base station.

In step 1520, the base station and the terminal perform authentication. In step 1530, the base station and the terminal perform a Non Access Stratum (NAS) security procedure to safely send a NAS message. In step 1540, the base station inquires of the terminal about CA capability information. Herein, the CA capability information includes CA mode information supported by the terminal.

In step 1550, the terminal transmits the CA capability information to the base station. Herein, the CA capability information includes the CA mode information supported by the terminal. The CA mode information includes information about accessible bands of the terminal. That is, the terminal transmits to the base station information of whether it supports the CA. When supporting the CA, the terminal provides detailed capacity information for the CA. For example, the terminal can provide the base station with information notifying whether to support the TDD-FDD CA.

In step 1560, the base station and the terminal perform an RRC security procedure to safely send the RRC message. In step 1570, the base station sends an RRC connection reconfiguration message to the terminal. In so doing, when the terminal supports a particular CA mode, the base station can provide necessary information for the terminal to connect in the particular CA mode. That is, the base station can configure the CA to apply to the terminal based on the terminal capability information. In step 1580, the terminal sends an RRC connection reconfiguration complete message to the base station. Hence, the terminal connects in the particular CA mode. According to an embodiment of the present invention, the terminal can connect in the TDD-FDD CA mode.

The secondary cell is managed in the RRC layer of the base station. For example, the base station checks whether the CA is supported through the RRC layer, manages channel measurement setup of a carrier allocable to the secondary cell and an allocated carrier, secondary cell addition, change, and release, secondary cell system information provision, and PUCCH resource setup, and also performs primary cell activation and primary cell handover to enable the CA because the secondary cell exists. The base station manages activation and deactivation of the secondary cell added in the RRC layer, resource allocation and scheduling, and transport channel creation through a Media Access Control (MAC) layer. A procedure for the secondary management in the RRC layer is shown in FIG. 16.

Figure 16:
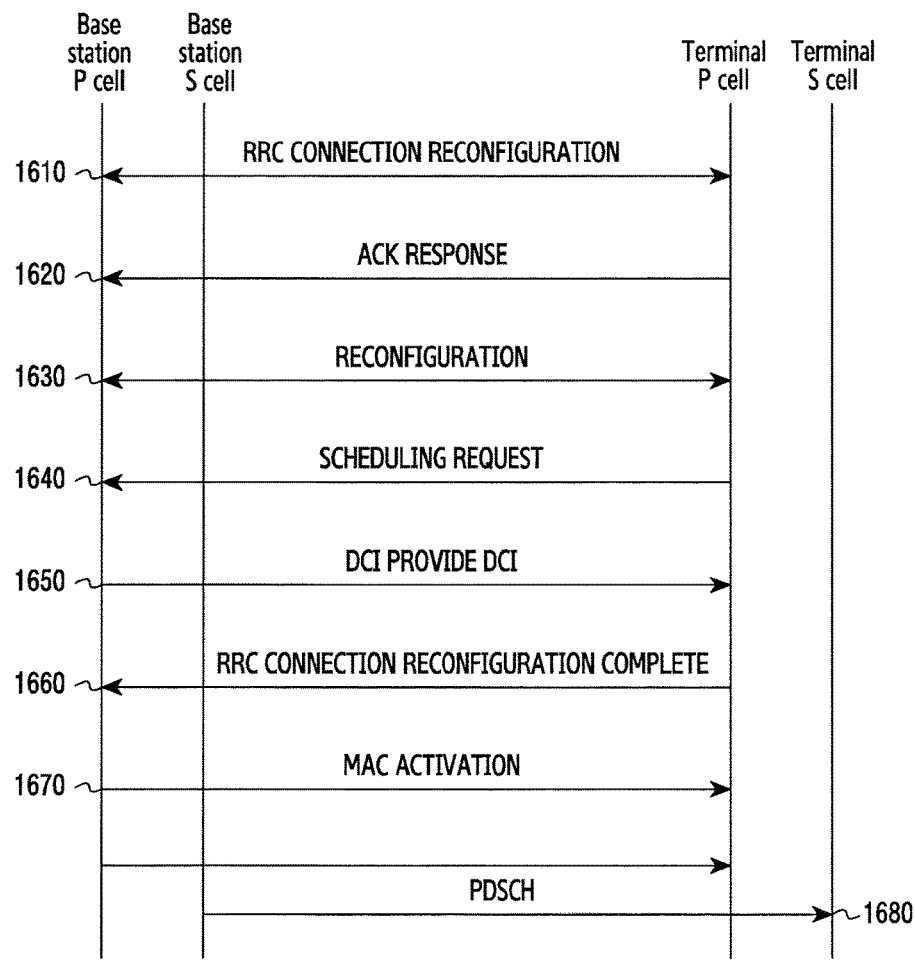
FIG. 16 depicts an example of a Radio Resource Control (RRC) connection reconfiguration procedure in a wireless communication system according to an embodiment of the present invention.

FIG. 16 depicts an example of an RRC connection reconfiguration procedure in a wireless communication system according to an embodiment of the present invention.

In step 1610, a primary cell of the base station sends an RRC connection reconfiguration message to a primary cell of the terminal. When the terminal supports a particular CA mode, the base station can provide RRC connection information so that the terminal can connect in the particular CA mode.

In step 1620, the terminal sends HARQ ACK information from a primary cell to the primary cell of the base station. The ACK signal is information for informing the base station of whether the terminal successfully receives the information. In response to the RRC connection reconfiguration message received from the base station, the terminal sends ACK information to the base station.

In step 1630, when the base station receives the ACK response from the terminal, the base station and the terminal reconfigures the connection information for the connection in a new mode. In step 1640, the terminal requests scheduling from the primary cell to the primary cell of the base station. The terminal receives information from the base station and requests the scheduling from the base station to allocate a resource for the RRC connection reconfiguration.

In step 1650, the base station provides DCI information from the primary cell to the primary cell of the terminal. The base station provides the DCI information in response to the scheduling allocation request of the terminal so that the terminal can be allocated the resource.

In step 1660, the terminal completes the RRC connection configuration from the primary cell to the primary cell of the base station. The terminal is allocated the resource by receiving the RRC connection reconfiguration information from the base station, and completes the RRC connection reconfiguration. In step 1670, the secondary cell added through the MAC layer is activated from the primary cell of the base station to the primary cell of the base station. In step 1580, the primary cell and the secondary cell of the base station send Physical Downlink Shared Channel (PDSCH) information to the primary cell and the secondary cell of the terminal.

Figure 17:
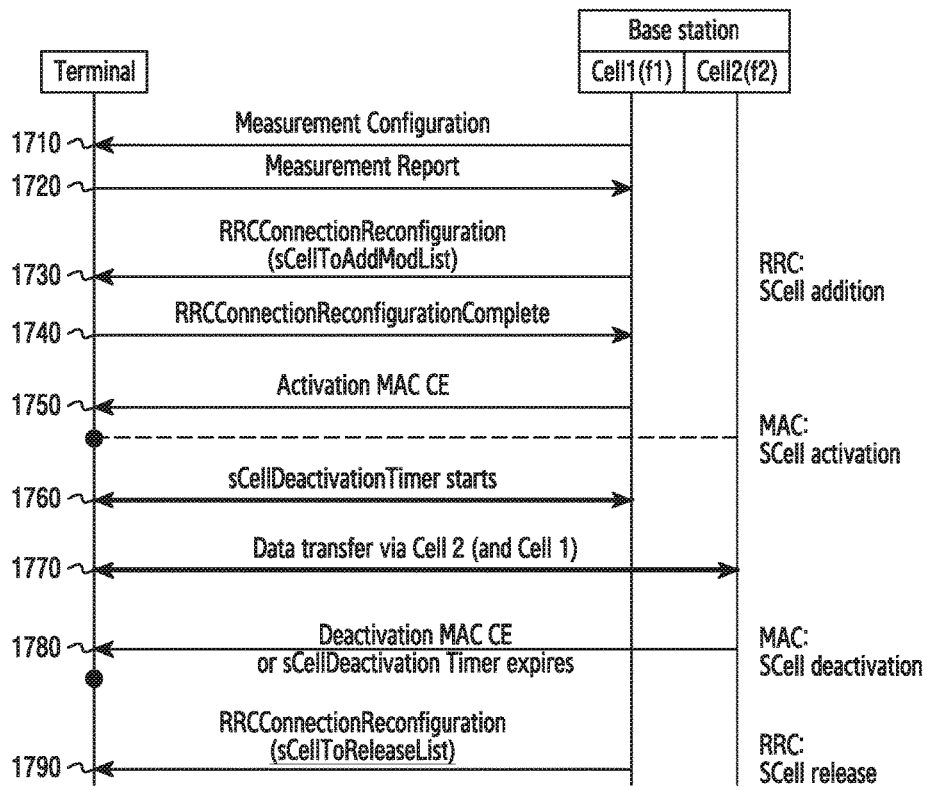
FIG. 17 depicts a control signal procedure for CA in a wireless communication system according to an embodiment of the present invention.

FIG. 17 depicts a control signaling procedure for CA in a wireless communication system according to an embodiment of the present invention.

In step 1710, a first cell of the base station requests measurement configuration information from the terminal. The base station requests information for identifying addition information of a secondary cell of the terminal.

In step 1720, the terminal transmits measurement report information to the first cell of the base station. The terminal transmits information about whether to add the secondary cell, to the base station. In step 1630, the first cell of the base station transmits RRC connection reconfiguration information to the terminal. When receiving the information of the secondary cell addition from the terminal, the base station transmits RRC connection reconfiguration information to the terminal. In step 1740, the terminal transmits RRC connection reconfiguration complete information to the first cell of the base station. When receiving the RRC connection reconfiguration information from the base station, the terminal completes the RRC connection reconfiguration by adding a second cell as the secondary cell and applying the secondary cell configuration.

In step 1750, the first cell of the base station transmits MAC activation information to the terminal. The base station activates the cell through the MAC layer. In steps 1760 and 1770, data is transmitted via the second cell and the first cell. In step 1780, the second cell of the base station sends a MAC deactivation message to the terminal. When a certain time passes, the base station deactivates the cell through the MAC layer. In step 1790, the first cell of the base station transmits RRC connection reconfiguration information to the terminal. The base station performs the RRC connection reconfiguration to the terminal to release the secondary cell.

Figure 18:
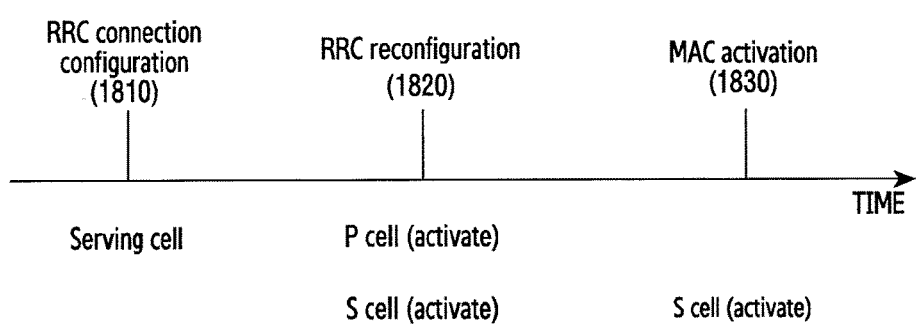
FIG. 18 depicts a configuration procedure for CA in a wireless communication system according to an embodiment of the present invention.

FIG. 18 depicts a configuration procedure for CA in a wireless communication system according to an embodiment of the present invention.

In step 1810, the base station performs initial configuration of the RRC layer. In step 1820, the base station performs RRC reconfiguration. The base station activates the primary cell through the RRC layer. When the terminal measures a Reference Signal Received Power (RSRP) and transmits a measurement result to the base station, the base station receives the measurement result and activates the primary cell. More specifically, the secondary cell management according to a trigger event provided from the terminal to the base station is as follows.

TABLE 1

| event name | content | operation |
| --- | --- | --- |
| Event A1 | The quality of the serving base station is higher than the threshold | activating the secondary cell |
| Event A2 | The quality of the serving base station is lower than the threshold | removing the secondary cell |
| Event A3 | The offset of the neighboring base station is higher than the serving base station | |
| Event A4 | The quality of the neighboring base station is higher than the threshold | adding the secondary cell |
| Event A5 | The quality of the serving base station is lower than the first threshold, the quality of the neighboring base station is higher than the second threshold | handing-over the primary cell |
| Event A6 | The offset of the neighbor base station is superior to the secondary cell. | substituting the secondary cell |

In step 1830, the base station activates and deactivates the secondary cell through the MAC layer. The MAC layer has an available secondary cell, and the secondary cell can be activated if necessary. Secondary cell activation indication is conducted through a MAC control element in the primary cell subframe. The MAC may directly determine to deactivate the secondary cell, and may automatically deactivate the secondary cell when a time passes.

Figure 19:
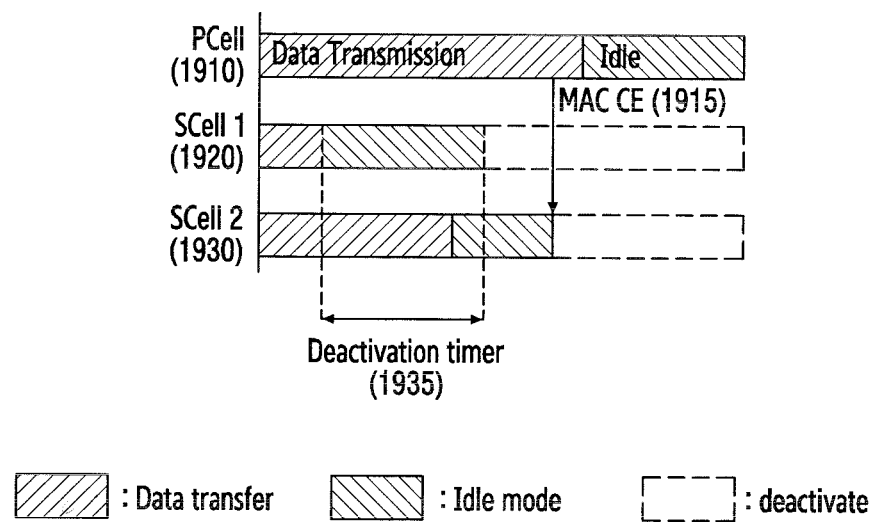
FIG. 19 depicts secondary cell configuration activation or deactivation in a wireless communication system according to an embodiment of the present invention.

FIG. 19 depicts an example of secondary cell configuration activation or deactivation in a wireless communication system according to an embodiment of the present invention.

Referring to FIG. 19, a CA mode including a primary cell 1910, a first secondary cell 1920, and a second secondary cell 1930 is in progress. Initially, data is transmitted over all of the primary cell 1910, the first secondary cell 1920, and the second secondary cell 1930. Next, the first secondary cell 1920 switches to an idle mode and maintains the idle mode during a deactivation timer 1925, and thus the first secondary cell 1920 is deactivated. Also, due to other factor such as channel quality degradation, the base station can determine to deactivate the second secondary cell 1920. In this case, a MAC Control Element (CE) indicating the deactivation of the second secondary cell 1920 is transmitted over the primary cell 1910, and the second secondary cell 1920 is deactivated. Next, the primary cell 1910 can switch to the idle mode.

Figure 20:
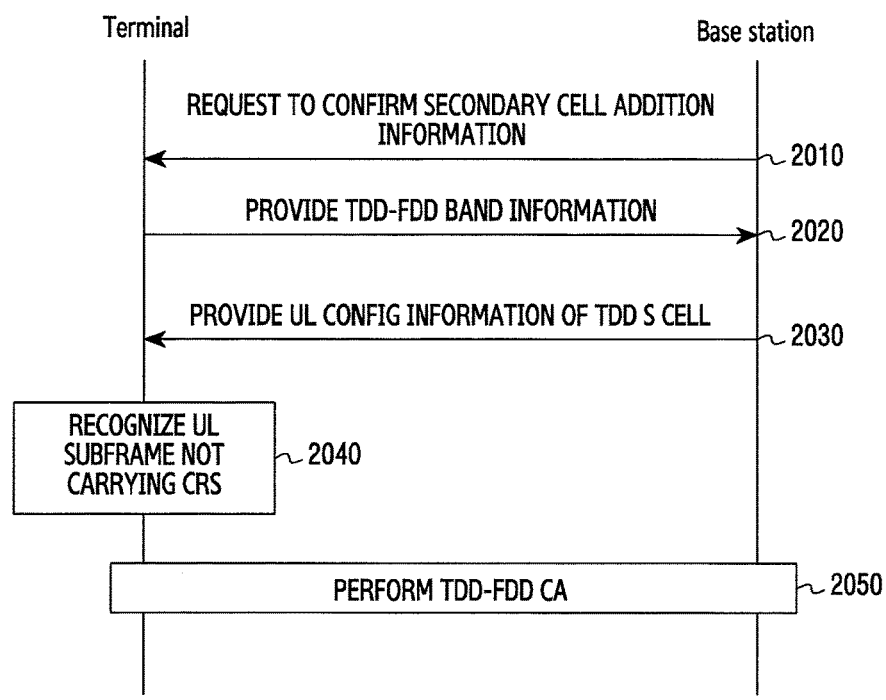
FIG. 20 depicts a signal exchange procedure for CA in a wireless communication system according to an embodiment of the present invention.

FIG. 20 depicts a signal exchange procedure for CA in a wireless communication system according to an embodiment of the present invention.

Referring to FIG. 20, in step 2010, the terminal transmits CA capability information to the base station. The CA capability information includes information notifying that the terminal can perform the TDD-FDD CA. For example, the CA capability information can include supportable band information of the terminal. That is, when notifying the TDD-FDD CA support, the CA capability information can include, as the supportable band information of the terminal, at least one TDD band information and at least one FDD band information.

In step 2020, the base station transmits TDD cell configuration information. The base station transmits uplink and downlink configuration information of a TDD secondary cell to the terminal through an RRC signal. For example, the TDD cell configuration information can include configuration information of a TDD frame used in the TDD cell. More specifically, the TDD cell configuration information can include at least one of a rate of downlink subframes and uplink subframes, arrangement of the downlink subframes and the uplink subframes, and identification information indicating a predefined configuration for the rate and the arrangement. Herein, the indictable frame configurations include a configuration where all of subframes are downlink subframes.

In step 2030, the terminal recognizes a subframe not carrying a CRS in the TDD frame. For example, the subframe not carrying the CRS is the uplink subframe. That is, the terminal can recognize the TDD uplink subframe not carrying the CRS based on the TDD cell configuration information received from the base station. Thus, the terminal can prevent a malfunction by avoiding channel estimation on the uplink subframe.

In step 2040, the terminal operates in the TDD-FDD CA. The terminal performs the CA with the base station over other subframes than the uplink frames of the TDD cell and the FDD cell based on the cell configuration information received from the base station. For doing so, the terminal and the base station can further perform signaling to configure and activate the TDD cell, which is not illustrated in FIG. 20.

Figure 21:
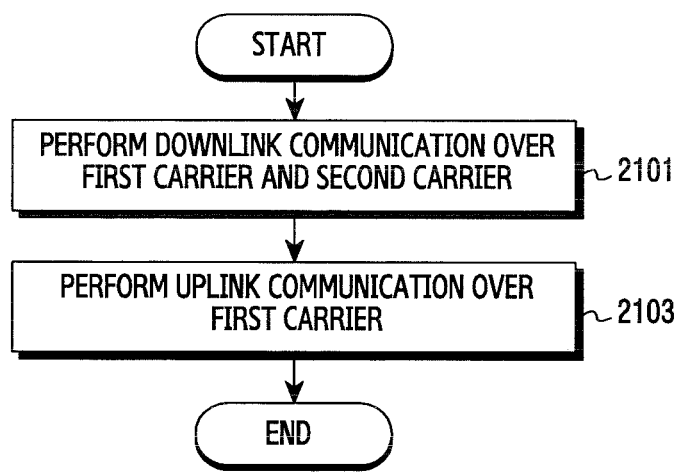
FIG. 21 depicts an operating procedure of a terminal in a wireless communication system according to an embodiment of the present invention.

FIG. 21 depicts an operating procedure of a terminal in a wireless communication system according to an embodiment of the present invention. Hereafter, the procedure of FIG. 21 can be executed by the terminal. However, the procedure of FIG. 21 can be executed also by a base station.

Referring to FIG. 21, the terminal performs downlink communication over a first carrier and a second carrier in step 2101. That is, the terminal operates in CA using the first carrier and the second carrier. Herein, the first carrier is operated using the FDD scheme, and the second carrier is operated using the TDD scheme. Also, the first carrier can occupy a lower frequency band than the second carrier. Yet, when the terminal leaves a downlink coverage of the second carrier, downlink communication using the second carrier can be excluded. For doing so, the terminal can transmit to the base station a measurement report for determining leaving the downlink coverage of the second carrier.

In step 2103, the terminal performs uplink communication using the first carrier. That is, unlike the downlink communication, the terminal uses only the first carrier for the uplink communication. Accordingly, the cell coverage by the second carrier operated using the TDD scheme can be expanded. The terminal, which does not perform the uplink communication over the second carrier, can conduct the downlink communication using resources in a guard period, in a subframe of the second carrier including the guard period for another terminal which performs uplink communication over the second carrier.

In the embodiment of FIG. 21, the uplink communication is conducted only through the first carrier. However, according to another embodiment of the present invention, the uplink communication can be fulfilled over the second carrier. For example, when the terminal is outside the uplink coverage of the second carrier, it performs the uplink communication only over the first carrier. However, within the uplink coverage of the second carrier, the terminal can perform the uplink communication over the first carrier and the second carrier. For doing so, the base station needs to determine whether the terminal is located inside the uplink coverage. Hence, the terminal can transmit the measurement report to determine leaving the uplink coverage of the second carrier.

Figure 22:
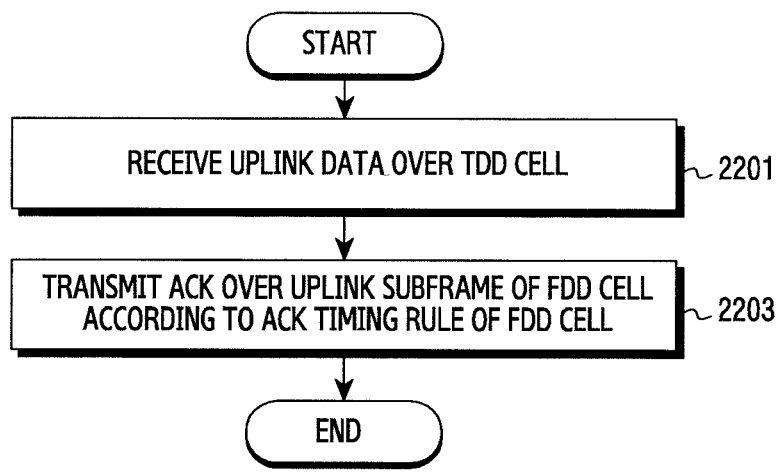
FIG. 22 depicts an operating procedure of a terminal in a wireless communication system according to another embodiment of the present invention.

FIG. 22 depicts an operating procedure of a terminal in a wireless communication system according to another embodiment of the present invention.

Referring to FIG. 22, the terminal receives downlink data over a TDD cell in step 2201. The HARQ scheme is applied to the downlink data, and accordingly the terminal determines whether decoding is successful. Thus, when the decoding is successful, the terminal generates ACK for feeding back the successful reception.

Next, the terminal transmits the ACK over an uplink subframe of an FDD cell according to an ACK timing rule of the FDD cell in step 2203. That is, the ACK for the downlink data received over the TDD cell is transmitted over an uplink control channel of the FDD cell. Also, the ACK transmission timing follows the ACK timing rule applied to the FDD cell. For example, when receiving second downlink data over the downlink subframe of the first carrier and the downlink subframe of the second carrier, which are at the same position on the time axis, the terminal can transmit ACK for the first downlink data and ACK for the second downlink data over the same uplink subframe of the first carrier.

For the ACK feedback as shown in FIG. 22, the base station can allocate a resource for the ACK feedback so as to operate the ACK timing as stated above. That is, the base station can allocate an uplink resource for the ACK feedback for the downlink data transmitted on the TDD cell, in the FDD cell.

Figure 23:
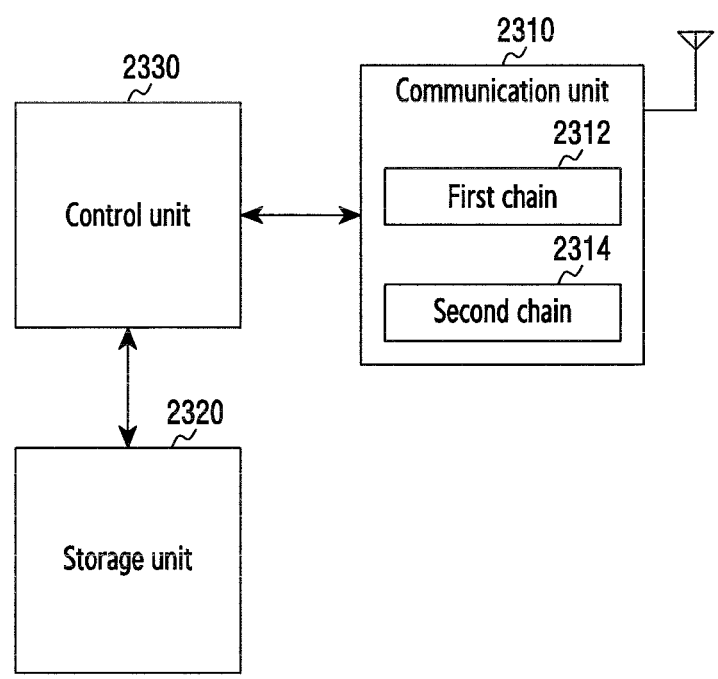
FIG. 23 depicts a block diagram of a terminal in a wireless communication system according to an embodiment of the present invention.

FIG. 23 depicts a block diagram of a terminal in a wireless communication system according to an embodiment of the present invention.

Referring to FIG. 23, the terminal includes a communication unit 2310, a storage unit 2320, and a control unit 2330.

The communication unit 2310 performs functions such as signal band conversion and amplification, for transmitting and receiving signals over a radio channel. That is, the communication unit 2310 up-converts a baseband signal fed from the communication unit 2310 to a Radio Frequency (RF) signal and then transmits it over an antenna, and down-converts an RF signal received over the antenna to a baseband signal. For example, the communication unit 2310 can include a transmit filter, a receive filter, an amplifier, a mixer, an oscillator, a Digital to Analog Converter (DAC), and an Analog to Digital Converter (ADC). Although the single antenna is depicted in FIG. 23, the terminal can include a plurality of antennas. Also, the communication unit 2310 can include a plurality of chains 2312 and 2314 for connecting a plurality of cells over a plurality of carriers, that is, for operating in the CA. The communication unit 2310 transmits and receives signals as mentioned above. Hence, the communication unit 2310 and the communication unit 2310 can be referred to as a transmitter, a receiver, or a transceiver.

The storage unit 2320 stores a basic program for the operations of the terminal, an application program, and data such as configuration information. The storage unit 2330 provides the stored data according to a request of the control unit 2340.

The control unit 2340 controls general operations of the terminal. For example, the control unit 2340 transmits and receives signals through the communication unit 2310. Also, the control unit 2340 records and reads data in and from the storage unit 2340. For doing so, the control unit 2340 can include at least one processor. According to an embodiment of the present invention, the control unit 2340 controls to operate in the FDD-TDD CA. For example, the control unit 2340 can control the terminal to execute the procedures of FIG. 8 through FIG. 23. The operations of the control unit 2340 according to an embodiment of the present invention are as follows.

According to an embodiment of the present invention, the control unit 2330 controls to perform downlink communication using a first carrier and a second carrier. Herein, the first carrier is operated using the FDD scheme, and the second carrier is operated using the TDD scheme. Also, the first carrier can occupy a lower frequency band than the second carrier. The control unit 2330 can control to perform uplink communication over the first carrier. That is, unlike the downlink communication, the control unit 2330 uses only the first carrier for the uplink communication. Since the uplink communication is not performed over the second carrier, the control unit 2330 can conduct the downlink communication over resources in a guard period, in a subframe of the second carrier including the guard period for another terminal which performs uplink communication over the second carrier.

According to another embodiment of the present invention, when the terminal leaves a downlink coverage of the second carrier, downlink communication using the second carrier can be excluded. For doing so, the control unit 2330 can transmit to the base station a measurement report for determining leaving the downlink coverage of the second carrier.

According to yet another embodiment of the present invention, the uplink communication can be fulfilled over the second carrier. For example, outside the uplink coverage of the second carrier, the control unit 2330 performs the uplink communication only over the first carrier. However, inside the uplink coverage of the second carrier, the control unit 2330 can perform the uplink communication over the first carrier and the second carrier. For doing so, the base station needs to determine whether the terminal is located inside the uplink coverage. Hence, the control unit 2330 can transmit the measurement report to determine whether it leaves the uplink coverage of the second carrier.

According to still another embodiment of the present invention, when receiving downlink data over a TDD cell, the control unit 2330 generates ACK for feeding back the successful reception and transmits the ACK over an uplink subframe of an FDD cell according to an ACK timing rule of the FDD cell. That is, the ACK for the downlink data received over the TDD cell is transmitted over an uplink control channel of the FDD cell, and the ACK transmission timing follows the ACK timing rule applied to the FDD cell. For example, when receiving second downlink data over the downlink subframe of the first carrier and the downlink subframe of the second carrier at the same position on the time axis, the control unit 2330 can control to transmit ACK for the first downlink data and ACK for the second downlink data over the same uplink subframe of the first carrier.

Figure 24:
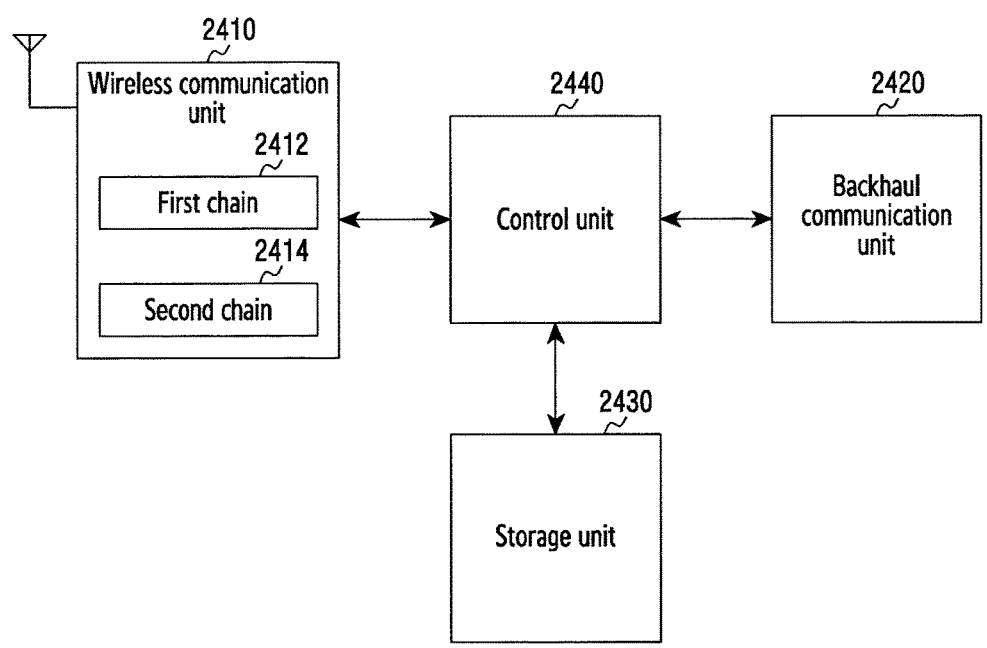
FIG. 24 depicts a block diagram of a base station in a wireless communication system according to an embodiment of the present invention.

FIG. 24 depicts a block diagram of a base station in a wireless communication system according to an embodiment of the present invention.

Referring to FIG. 24, the base station includes a wireless communication unit 2410, a backhaul communication unit 2420, a storage unit 2430, and a control unit 2440.

The wireless communication unit 2410 performs functions such as signal band conversion and amplification, for transmitting and receiving signals over a radio channel. That is, the wireless communication unit 2410 up-converts a baseband signal fed from the wireless communication unit 2410 to an RF signal and then transmits it over an antenna, and down-converts an RF signal received over the antenna to a baseband signal. For example, the wireless communication unit 2410 can include a transmit filter, a receive filter, an amplifier, a mixer, an oscillator, a DAC, and an ADC. Although the single antenna is depicted in FIG. 24, the wireless communication unit 2410 can include a plurality of antennas. Also, the wireless communication unit can include a plurality of chains 2412 and 2414 for providing a plurality of cells over a plurality of carriers, that is, for supporting the CA. The wireless communication unit 2410 transmits and receives signals as mentioned above. Hence, the wireless communication unit 2410 and the wireless communication unit 2410 can be referred to as a transmitter, a receiver, or a transceiver.

The backhaul communication unit 2420 provides an interface for communicating with other nodes in a network. That is, the backhaul communication unit 2420 converts a bit string transmitted from the base station to other node, for example, to another base station or a core network, to a physical signal, and converts a physical signal received from the other node to a bit string.

The storage unit 2430 stores a basic program for the operations of the base station, an application program, and data such as configuration information. The storage unit 2430 provides the stored data according to a request of the control unit 2440.

The control unit 2440 controls general operations of the base station. For example, the control unit 2440 transmits and receives signals through the baseband processing unit 2420 and the wireless communication unit 2410 or through the backhaul communication unit 2420. Also, the control unit 2440 records and reads data in and from the storage unit 2430. For doing so, the control unit 2440 can include at least one processor. According to an embodiment of the present invention, the control unit 2440 controls to support the FDD-TDD CA. For example, the control unit 2440 can control the base station to execute the procedures of FIG. 8 through FIG. 21. The operations of the control unit 2440 according to an embodiment of the present invention are as follows.

According to an embodiment of the present invention, the control unit 2440 controls to perform downlink communication using a first carrier and a second carrier. Herein, the first carrier is operated using the FDD scheme, and the second carrier is operated using the TDD scheme. Also, the first carrier can occupy a lower frequency band than the second carrier. The control unit 2440 controls to perform uplink communication over the first carrier. That is, unlike the downlink communication, the control unit 2440 uses only the first carrier for the uplink communication. Since the uplink communication is not performed over the second carrier, the control unit 2440 can conduct the downlink communication over resources in a guard period, in a subframe of the second carrier including the guard period for another terminal which performs uplink communication over the second carrier. For doing so, the control unit 2440 can allocate a resource to the terminal operating in the FDD-TDD CA within the downlink resources of the first carrier, the downlink resources of the second carrier, and the uplink resources of the first carrier.

According to another embodiment of the present invention, when the terminal leaves a downlink coverage of the second carrier, the downlink communication using the second carrier can be excluded. For doing so, the control unit 2440 can receive from the terminal a measurement report for determining leaving the downlink coverage of the second carrier.

According to yet another embodiment of the present invention, the uplink communication can be fulfilled over the second carrier. For example, outside the uplink coverage of the second carrier, the control unit 2440 performs the uplink communication only over the first carrier. However, within the uplink coverage of the second carrier, the control unit 2440 can perform the uplink communication over the first carrier and the second carrier. For doing so, the control unit 2440 needs to determine whether the terminal is located inside the uplink coverage. Hence, the control unit 2440 can receive the measurement report to determine leaving the uplink coverage of the second carrier.

According to still another embodiment of the present invention, when transmitting downlink data over a TDD cell, for the uplink of the FDD cell according to the ACK timing rule of the FDD cell, the control unit 2440 can allocate a resource for ACK feedback so as to operate the ACK timing. That is, the control unit 2440 can allocate the uplink resource for the ACK feedback for the downlink data transmitted on the TDD cell, in the FDD cell.

The methods described according to claims or various embodiments of the present invention can be implemented in software, firmware, hardware, or in their combinations.

As for the software, a computer-readable storage medium storing one or more programs (software modules) can be provided. One or more programs stored in the computer-readable storage medium can be configured for execution by one or more processors in an electronic device. One or more programs can include instructions for controlling the electronic device to execute the methods described according to claims or various embodiments of the present invention.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the program can be stored to a memory combining part or all of those recording media. Also, a plurality of memories may be included.

The program can be stored in an attachable storage device accessible via a communication network such as Internet, Intranet, Local Area Network (LAN), Wide LAN (WLAN), or Storage Area Network (SAN), or a communication network by combining these networks. The storage device can access the device of the present invention through an external port. Also, a separate storage device may access the device of the present invention over the communication network.

In the specific embodiments of the present invention, the elements included in the invention are expressed in a singular or plural form. However, the singular or plural expression is appropriately selected according to a proposed situation for the convenience of explanation and the present invention is not limited to a single element or a plurality of elements. The elements expressed in the plural form may be configured as a single element and the elements expressed in the singular form may be configured as a plurality of elements.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operating a terminal in a wireless communication system, the method comprising:
   receiving, from a base station, a first downlink signal through a first carrier using frequency division duplex (FDD) scheme and a second downlink signal through a second carrier using-time division duplex (TDD) scheme based on FDD-TDD carrier aggregation (CA); and
   transmitting, to the base station, a first uplink signal corresponding to the first downlink signal and a second uplink signal corresponding to the second downlink signal,
   wherein the second uplink signal is transmitted through the first carrier using the FDD scheme, in a first case that the terminal is located out of an uplink coverage of the second carrier,
   wherein the second uplink signal is transmitted through the second carrier using the TDD scheme, in a second case that the terminal is located in the uplink coverage of the second carrier, and
   wherein, in the first case, resources used for downlink communication using the second carrier include a resource in a guard period of at least one special subframe, and the guard period is used for switching from a downlink operation to an uplink operation by another terminal which performs uplink communication through the second carrier.

2. The method of claim 1, further comprising:
   transmitting acknowledge (ACK) for downlink data received through the second carrier, through an uplink resource of the first carrier;
   receiving first downlink data through a downlink subframe of the first carrier;
   receiving second downlink data through a downlink subframe of the first carrier and a downlink subframe of the second carrier at the same position on a time axis; and transmitting ACK for the first downlink data and ACK for the second downlink data through the same uplink subframe of the first carrier.

3. The method of claim 1, further comprising:
measuring a channel state for the second carrier; and
transmitting information of the channel state of the second carrier through the first carrier.

4. The method of claim 1, further comprising:
transmitting, to the base station, a first message notifying that the terminal supports TDD-FDD CA using the first carrier and the second carrier.

5. The method of claim 1,
wherein the second uplink signal includes acknowledge (ACK) information for downlink data in the second downlink signal, and
wherein the second ACK information is transmitted according to a timing of ACK feedback in the first carrier.

6. A method for operating a base station in a wireless communication system, the method comprising:
transmitting, to a terminal, a first downlink signal through a first carrier using frequency division duplex (FDD)-scheme and a second downlink signal through a second carrier using time division duplex (TDD) scheme based on FDD-TDD carrier aggregation (CA); and
receiving, from the terminal, a first uplink signal corresponding to the first downlink signal and a second uplink signal corresponding to the second downlink signal,
wherein the second uplink signal is received through the first carrier using the FDD scheme, in a first case that the terminal is located out of an uplink coverage of the second carrier,
wherein the second uplink signal is received through the second carrier using the TDD scheme, in a second case that the terminal is located in the uplink coverage of the second carrier, and
wherein, in the first case, resources used for downlink communication using the second carrier include a resource in a guard period of at least one special subframe, and the guard period is used for switching from a downlink operation to an uplink operation by another terminal which performs uplink communication through the second carrier.

7. The method of claim 6, further comprising:
allocating a resource to the terminal in downlink resources of the first carrier, downlink resources of the second carrier, and uplink resources of the first carrier.

8. The method of claim 6, further comprising:
receiving acknowledge (ACK) for downlink data received through the second carrier, through an uplink resource of the first carrier;
transmitting first downlink data through a downlink subframe of the first carrier;
transmitting second downlink data through a downlink subframe of the first carrier and a downlink subframe of the second carrier at the same position on a time axis; and
receiving ACK for the first downlink data and ACK for the second downlink data through the same uplink subframe of the first carrier.

9. The method of claim 6, wherein the first carrier occupies a lower frequency band than the second carrier.

10. An apparatus for a terminal in a wireless communication system, the apparatus comprising:
a transceiver; and
at least one processor operatively coupled with the transceiver,
wherein the at least one processor is configured to control to:
receive, from a base station, a first downlink signal through a first carrier using frequency division duplex (FDD) scheme and a second downlink signal through a second carrier using-time division duplex (TDD) scheme based on FDD-TDD carrier aggregation (CA), and
transmit, to the base station, a first uplink signal corresponding to the first downlink signal and a second uplink signal corresponding to the second downlink signal,
wherein the second uplink signal is transmitted through the first carrier using the FDD scheme, in a first case that the terminal is located out of an uplink coverage of the second carrier,
wherein the second uplink signal is transmitted through the second carrier using the TDD scheme, in a second case that the terminal is located in the uplink coverage of the second carrier, and
wherein, in the first case, resources used for downlink communication using the second carrier include a resource in a guard period of at least one special subframe, and the guard period is used for switching from a downlink operation to an uplink operation by another terminal which performs uplink communication through the second carrier.

11. The apparatus of claim 10,
wherein the at least one processor is further configured to control to:
transmit acknowledge (ACK) for downlink data received through the second carrier, through an uplink resource of the first carrier,
receive first downlink data through a downlink subframe of the first carrier,
receive second downlink data through a downlink subframe of the first carrier and a downlink subframe of the second carrier at the same position on a time axis, and
transmit ACK for the first downlink data and ACK for the second downlink data through the same uplink subframe of the first carrier.

12. The apparatus of claim 10, wherein the at least one processor is further configured to control to:
measure a channel state for the second carrier, and
transmit information of the channel state of the second carrier through the first carrier.

13. The apparatus of claim 10, wherein the first carrier comprises a lower frequency band than the second carrier.

14. The apparatus of claim 10, wherein the second uplink signal comprises an acknowledgement (ACK) for downlink data received through the second carrier.

15. The apparatus of claim 10, wherein the second uplink signal comprises information of a channel state of the second carrier.

16. The apparatus of claim 10, wherein the second uplink signal comprises a measurement report for determining leaving a downlink coverage of the second carrier.

17. The apparatus of claim 10, wherein the second uplink signal comprises uplink control information for the second carrier.

* * * * *